(12) United States Patent
Bestaoui-Spurr et al.

(10) Patent No.: US 11,155,751 B2
(45) Date of Patent: Oct. 26, 2021

(54) METHOD OF TREATING SUBTERRANEAN FORMATIONS WITH COMPOSITES HAVING ENHANCED STRENGTH

(71) Applicant: Baker Hughes, a GE company, LLC, Houston, TX (US)

(72) Inventors: Naima Bestaoui-Spurr, The Woodlands, TX (US); Hanh Nguyen, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/254,375

(22) Filed: Jan. 22, 2019

(65) Prior Publication Data

US 2020/0231867 A1 Jul. 23, 2020

(51) Int. Cl.
*E21B 43/267* (2006.01)
*C09K 8/80* (2006.01)

(52) U.S. Cl.
CPC ............ *C09K 8/805* (2013.01); *E21B 43/267* (2013.01)

(58) Field of Classification Search
CPC .............................. C09K 8/805; E21B 43/267
USPC ...................................................... 166/280.2
See application file for complete search history.

(56) References Cited

U.S. PATENT DOCUMENTS

| 4,081,029 A | 3/1978 | Holm |
| 4,154,894 A | 5/1979 | Bushey |
| 4,432,798 A | 2/1984 | Helferich et al. |
| 4,469,517 A | 9/1984 | Cooke, Jr. |
| 4,585,064 A | 4/1986 | Graham et al. |
| 4,713,203 A | 12/1987 | Andrews |
| 5,342,595 A | 8/1994 | Davidovits et al. |
| 5,798,307 A | 8/1998 | Davidovits et al. |
| 6,059,034 A | 5/2000 | Rickards et al. |
| 6,330,916 B1 | 12/2001 | Rickards et al. |
| 6,364,018 B1 | 4/2002 | Brannon et al. |
| 6,742,590 B1 | 6/2004 | Nguyen |
| 7,160,844 B2 | 1/2007 | Urbanek |
| 7,931,087 B2 | 4/2011 | Gupta |
| 9,562,188 B2 | 2/2017 | Monroe et al. |
| 9,683,431 B2 | 6/2017 | Lant et al. |
| 9,822,621 B2 | 11/2017 | Lant et al. |
| 10,047,280 B2 | 8/2018 | Monroe et al. |

(Continued)

FOREIGN PATENT DOCUMENTS

| CA | 2447928 A1 | 5/2005 |
| CA | 2540415 A1 | 5/2005 |

(Continued)

OTHER PUBLICATIONS

EP Search Report in EP 14859137.3, dated May 4, 2017 (8 pp.).

(Continued)

*Primary Examiner* — Zakiya W Bates
*Assistant Examiner* — Ashish K Varma
(74) *Attorney, Agent, or Firm* — John Wilson Jones; Jones Delflache LLP

(57) ABSTRACT

The strength of a proppant or sand control particulate may be improved by coating the proppant to form a composite. The composite has enhanced compressive strength between about 34 to about 130 MPa and minimizes the spalling of fines at closure stresses in excess of 5,000 psi. Conductivity of the proppant pack in the fractures is further enhanced due to the increase in strength of the particles.

21 Claims, 2 Drawing Sheets

(56) References Cited

U.S. PATENT DOCUMENTS

| | | |
|---|---|---|
| 2003/0102128 A1 | 6/2003 | Dawson et al. |
| 2005/0244641 A1 | 11/2005 | Vincent |
| 2007/0023187 A1 | 2/2007 | Canova et al. |
| 2007/0131145 A1 | 6/2007 | Biscan et al. |
| 2009/0100766 A1 | 4/2009 | Gebhardt |
| 2010/0104873 A1 | 4/2010 | Wang et al. |
| 2010/0113251 A1 | 5/2010 | San-Miguel et al. |
| 2010/0203336 A1 | 8/2010 | Shiao et al. |
| 2011/0118155 A1 | 5/2011 | Pisklak et al. |
| 2011/0146985 A1* | 6/2011 | Xie ............... C03C 11/00 166/280.2 |
| 2011/0159240 A1 | 6/2011 | Shiao et al. |
| 2011/0160101 A1 | 6/2011 | Naderhoff et al. |
| 2011/0297383 A1 | 12/2011 | Tanguay et al. |
| 2012/0024026 A1 | 2/2012 | Varadachari |
| 2012/0152153 A1 | 6/2012 | Gong et al. |
| 2012/0156381 A1 | 6/2012 | Allouche et al. |
| 2012/0157358 A1 | 6/2012 | Fang et al. |
| 2013/0081812 A1 | 4/2013 | Green et al. |
| 2013/0274153 A1 | 10/2013 | Urbanek |
| 2014/0162911 A1* | 6/2014 | Monastiriotis ......... C09K 8/805 507/221 |
| 2015/0083397 A1 | 3/2015 | Monroe et al. |
| 2015/0114640 A1 | 4/2015 | Bestaoui-Spurr et al. |
| 2015/0290771 A1* | 10/2015 | Li ............... B24D 18/0018 51/295 |
| 2015/0299561 A1 | 10/2015 | Monroe et al. |
| 2016/0153274 A1 | 6/2016 | Hull et al. |
| 2017/0073576 A1* | 3/2017 | Bestaoui-Spurr .... B05D 3/0254 |

FOREIGN PATENT DOCUMENTS

| | | |
|---|---|---|
| CA | 2540429 A1 | 5/2005 |
| CA | 2475668 A1 | 1/2006 |
| CA | 2494051 A1 | 7/2006 |
| EP | 0595471 B1 | 6/1996 |
| EP | 3296278 A1 | 3/2018 |
| WO | 2010-041025 A1 | 4/2010 |
| WO | 2012055028 A1 | 5/2012 |
| WO | 2018164663 A1 | 9/2018 |

OTHER PUBLICATIONS

Abdullah MMA et al. "Mechanism and Chemical Reaction of Fly Ash Geopolymer Cement—A Review," Int. J. Pure Appl. Sci. Technol., 6(1), pp. 35-44 (2011).

International Search Report & Written Opinion in PCT/US2014/060671, dated Jan. 28, 2015.

Schubert, U., Chemistry and Fundamentals of the Sol-Gel Process, The Sol-Gel Handbook (2015).

International Search Report & Written Opinion in PCT/US2019/014603, dated Oct. 9, 2019.

Burns, L.D., et al., "New Generation Silicate Gel System for Casing Repairs and Water Shutoff," SPE 113490.

Burns, L.D., et al., "New Generation Silicate Gel System for Casing Repairs and Water Shutoff," SPE 113490, 2008.

\* cited by examiner

METHOD OF TREATING SUBTERRANEAN FORMATIONS WITH COMPOSITES HAVING ENHANCED STRENGTH

TECHNICAL FIELD

The disclosure relates to a method of treating a subterranean formation with a composite having a proppant or sand control particulate core and a coating covering at least a portion of the proppant or sand control particulate core. The coating strengthens the core and enhances the crush resistance of the core. At elevated stress conditions, the amount of fines generated during treatments using the proppant or sand control particulate core is dramatically decreased by the presence of the coating.

BACKGROUND OF THE DISCLOSURE

Hydraulic fracturing is a common stimulation technique used to enhance production of hydrocarbon fluids from subterranean formations. In a typical hydraulic fracturing treatment, a treatment fluid containing a solid proppant is injected into the formation at a pressure sufficiently high to cause the formation to fracture or cause enlargement of natural fractures in the reservoir. The viscosity of the fracturing fluid containing the proppant is typically increased by the presence of a gelling agent such as a polymer, which may be uncrosslinked or crosslinked, and/or a viscoelastic surfactant. The proppant is deposited in the fracture, where it remains until after the treatment is completed. During the treatment, the proppant holds the fracture open and creates a porous and permeable bed. The bed enhances the ability of fluids to migrate from the formation to the wellbore. Since productivity is dependent on the ability of the fracture to conduct fluids from the formation to the wellbore, fracture conductivity is an important parameter in determining the degree of success of a hydraulic fracturing treatment.

Choice of proppant is often critical to the success of the stimulation operation. If proppant granules cannot withstand the reservoir closure stress imposed by the formation, the granules are compressed together in such a way that they crush, and small particles of reservoir "fines" are generated from the proppant and/or reservoir matrix. This often leads to significant proppant pack conductivity damage and associated reduction in fracture conductivity. In some cases, production of fines may be exacerbated during production/workover operations when a well is shut-in and then re-opened. This phenomenon is known as "stress cycling" and is believed to result from increased differential pressure and closure stress that occurs during fluid production following shut-in. Production of fines is highly undesirable since fines reduce reservoir permeability by plugging pore throats in the reservoir.

Production of formation hydrocarbon-containing fluids having entrained particulate solids is also a common problem. The source of these particulate solids may be unconsolidated material from the formation, proppant from a fracturing treatment and/or fines generated from crushed fracture proppant, as mentioned above. Production of solid proppant material is commonly known as "proppant flowback." In addition to causing increased wear on downhole and surface production equipment, the presence of particulate materials in production fluids often leads to significant expense and production downtime associated with removing these materials from wellbores and/or production equipment. Accumulation of these materials in a wellbore may also restrict or even prevent fluid production. In addition, loss of proppant due to proppant flowback may also reduce conductivity of a fracture pack.

Due to its low cost and availability, silica ($SiO_2$) sand is typically used as proppant in fracturing operations as well as the particulate in sand control operations. The quality of the properties of sand vary depending on its origin. For instance, white sand, from the northern great lake regions (primarily Minnesota and Wisconsin) is monocrystalline, made of single quartz crystals that offer superior strength properties compared to other sands. Brown sand, such as Brady sand from Texas, is polycrystalline; each grain being composed of multiple crystals bonded together. The existence of cleavage planes within each grain results in greater crush and reduced properties of the proppant (or sand control particulate). Typically, untreated sand is not capable of withstanding closure stresses in excess of 6,000 psi. Such restrictions limit sand for use as a proppant or sand control particulate in shallow reservoirs. Stronger proppants and sand control particulates having closure stresses in excess of 6,000 psi are needed for use in reservoirs.

Resin-coated sand is known to generate fewer fines up to closure stresses of about 8,000 psi. Fracture conductivity would be enhanced in deeper completions by use of proppants and sand control particulates stronger than resin-coated sands. While ceramic material have been known to provide better conductivity for formation closures of over 12,000 psi, such materials are expensive. Alternatives have therefore been sought for enhancing conductivity in formations having closure stresses up to 12,000 psi while minimizing spalling of formation fines.

It should be understood that the above-described discussion is provided for illustrative purposes only and is not intended to limit the scope or subject matter of the claims set forth herein. Thus, none of the claims should be limited by the above discussion or construed to address, include or exclude each or any of the above-cited features or disadvantages merely because of the mention thereof herein.

SUMMARY OF THE DISCLOSURE

In an embodiment, a method of treating a subterranean formation is provided using a composite comprising a proppant or sand control particulate core strengthened with a coating covering at least a portion of the proppant. The coating on the proppant or sand control particulate core may be a hardened reaction product prepared from (a) silica or a silicate; (b) an alkali hydroxide or alkali oxide; (c) an aluminosilicate; and (d) at least one member selected from aluminum trichloride, zinc chloride, an alkaline earth oxide or hydroxide, such as calcium oxide, calcium hydroxide or magnesium oxide; an oxide of a transition metal; and a weak organic acid, salt, anhydride or ester (such as a $C_1$-$C_6$ alkyl ester) thereof that decomposes during the coating process to make an acid under in-situ conditions or a combination thereof.

In an embodiment, the composite may be prepared by etching at least a portion of the surface of the proppant or sand control particulate core prior to introducing any of (a), b), (c) or (d) to the proppant or sand control particulate core.

In an embodiment, the composite is prepared by applying a mixture comprising (a), (b) and (c) onto the surface of the core and hardening the mixture in the presence of aluminum trichloride and/or zinc chloride.

In an embodiment, the composite is prepared by applying a mixture comprising (a), (b), (c) and aluminum trichloride and/or zinc chloride onto the surface of the core and then hardening the mixture onto the surface of the core.

In an embodiment, the coating may be applied onto the core by first mixing the core with an aqueous solution of the silica or sodium silicate and sodium hydroxide to create a uniform wetness on the surface of the core; and then (ii) introducing to the wet core, a mixture of the aluminosilicate and aluminum trichloride and/or zinc chloride.

In another embodiment, a mixture of (a), (b), (c) and aluminum trichloride and/or zinc chloride may be first spread onto the surface of the core. Components (a), (b) and (c) may then undergo a sol-gel exothermic reaction.

In another embodiment, a slurry of (a), (b), (c) and the transition metal oxide and/or zinc chloride may be spread onto at least a portion of the surface of the core in a reactor. Aluminum trichloride and/or zinc chloride may optionally then be added to the reactor after spreading the slurry onto the core.

In another embodiment, the composite may be prepared by a sol-gel exothermic reaction wherein, in a first step, the proppant or sand control particulate core is combined with a mixture comprising sodium silicate and/or silica and an alkali hydroxide to wet the sand. A mixture of (a) aluminosilicate; (b) zinc oxide, an alkaline earth oxide or hydroxide, such as calcium hydroxide, calcium oxide and/or magnesium oxide; and (c) optional aluminum trichloride and/or zinc chloride may then be applied to the wet sand. The mixture may then be hardened onto at least a portion of the surface of the core in the vessel. A liquid solution of aluminum trichloride and/or zinc chloride may then be applied onto the core during hardening of the mixture. The resulting product may then be removed from the vessel to ensure complete hardening of the mixture onto the core.

In another embodiment, the composite may be prepared by a sol-gel exothermic reaction wherein the core is first combined with a slurry comprising (a) sodium silicate and/or silica; (b) an alkali hydroxide; (c) an aluminosilicate; and (d) zinc oxide, an alkaline earth oxide or hydroxide, such as calcium hydroxide, calcium oxide and/or magnesium oxide. The slurry is then applied onto the proppant core. The slurry is subjected to hardening onto the core. During hardening, dry aluminum trichloride and/or zinc chloride is applied onto the surface of the core. Water is sprayed onto the core as well during hardening of the slurry. The resulting product may then be removed from the vessel to ensure complete hardening of the mixture onto the core.

In another embodiment of the disclosure, a method of treating a subterranean formation is provided wherein a composite comprising a proppant or sand control particulate core strengthened with a coating covering at least a portion of the proppant is introduced into the well penetrating the formation. The coating may be a cured reaction product prepared from (a) compound selected from the group consisting of an alkali metal phosphate, a phosphoric acid, ammonium phosphate, and combinations thereof; (b) a binder selected from the group consisting of a metal oxide, a metal hydroxide, an alkaline earth metal hydroxide, an alkaline earth metal oxide, an aluminosilicate, and combinations thereof; (c) an alkali hydroxide or alkali oxide; and (d) at least one member selected from the group consisting of (i) aluminum trichloride, (ii) an alkaline earth oxide or hydroxide, such as calcium oxide, calcium hydroxide and/or magnesium oxide; (iii) an oxide of a transition metal or zinc chloride; and (iv) a weak organic acid, salt, anhydride or ester thereof that decomposes to make an acid under in-situ conditions, or a combination thereof.

In another embodiment, any of the composites referenced above may be introduced into a well in a fluid having a pH between from about 4.0 to about 12.0.

In another embodiment, the surface of any of the composites referenced above may be modified by applying onto the surface of the composite a treatment agent and hardening the treatment agent onto the surface of the composite.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
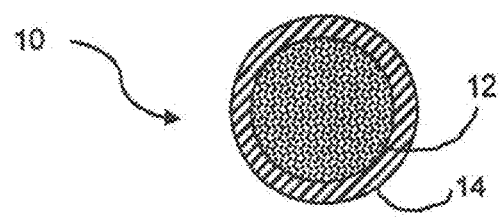
FIG. 1 is a schematic cross-section illustration of a coated proppant as described herein.

Characteristics and advantages of the present disclosure and additional features and benefits will be readily apparent to those skilled in the art upon consideration of the following detailed description of exemplary embodiments of the present disclosure and referring to the accompanying figures.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance. By way of example, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Further, reference herein to components and aspects in a singular tense or to the suffix(es) does not necessarily limit the present disclosure to only one such component or aspect, but should be interpreted generally to mean one or more, as may be suitable and desirable in each particular instance.

All ranges disclosed herein are inclusive of the endpoints. A numerical range having a lower endpoint and an upper endpoint shall further encompass any number and any range falling within the lower endpoint and the upper endpoint. For example, every range of values in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

All references are incorporated herein by reference.

The disclosure relates to composites comprised of a core and a hardened coating at least partially covering the core. A proppant or sand control particulate constitutes the core of the composite. The coating is an aluminosilicate or a chemically bonded phosphate ceramic (CBPC) and is prepared by a polycondensation or polymerization reaction.

The polymerization may be conducted at room temperature or initiated under mild heat causing the components to poly-condense or polymerize. A suitable temperature range to initiate the polymerization of the coating may range from about 0° C. to about 300° C.; in another non-restrictive embodiment from about 20° C. to about 300° C.; alternatively from about 60° C. to about 200° C.

The inorganic network surrounding the proppant or sand control particulate core with its amorphous three dimensional structure imparts improved mechanical properties to the proppant or sand control particulate. In particular, the coating significantly increases the compressive strength of the proppant or sand control particulate.

The increased strength of the composite makes the composite particularly effective in reducing the generation of fines. Fines are typically generated at the fracture-face to proppant pack interface as in situ closure stresses acting upon the fracture cause failure of the proppant, the formation rock, or both. Such stresses cause particulates of proppant to be compressed together such that fines are generated from the proppant pack and/or reservoir matrix. Since the composites are capable of withstanding high closure stresses applied on the proppant pack, the generation of fines is reduced.

In a preferred embodiment, the coating is homogeneous and at least partially covers the proppant or sand control particulate core. It will be appreciated that "at least partially covering the proppant or sand control particulate core" may be defined as the majority (over 50 wt. %) of the proppant or sand control particulates have at least some coating thereon even if 100 wt. % of the proppant or sand control particulates are not completely covered. Alternatively, "at least partially covering the proppant or sand control particulate cores" may be defined as at least the majority (over 50 wt. %) of the proppant or sand control particulates are completely covered with the coating. In another non-limiting embodiment, both of these definitions may be used simultaneously.

The coating contains a pH stabilizer, strength enhancer and/or polymerization rate enhancer.

The composite is compatible with well treatment fluids. When used in aqueous carrier fluids, such as fracturing fluids or aqueous slurries (such as those used in sand control operations), the pH of the fluid is stabilized. Thus, the pH of the fluid is not substantially affected by the presence of the composite and remains neutral to slightly basic. Typically, the pH of the fluid containing the composite is between from about 4 to about 12.

Such pH stabilization is principally due to the presence of the aluminum trichloride and/or zinc chloride in the coating or alternatively a weak organic acid, salt, or anhydride or ester thereof (such as a $C_1$-$C_6$ alkyl ester) that decomposes during the coating process to make an acid under in-situ conditions or a combination thereof. Exemplary weak organic acids include acetic acid, formic acid, citric acid, oxalic acid, malonic acid, succinic acid, malic acid, tartaric acid, lactic acid, fumaric acid, propionic acid, butyric acid, chloroacetic acid, edetatic acid, pentateic acid as well as mixtures thereof. In a preferred embodiment, the weak organic acid is acetic acid or citric acid.

The coating is preferably a geopolymer having an amorphous, three-dimensional non-crystalline structure similar to that of an aluminosilicate glass. The coating is made through polycondensation of hydroxyl groups or a polymerization reaction triggered at mild temperatures. The resultant coating is a very strong, rigid network possibly consisting of polymerized silicon and aluminum hydroxide in the form of rigid chains or nets of oxygen bonded tetrahedra.

The initiation of polymerization may proceed by preheating the core (to from 0 to about 300° C.) prior to the addition of any or all of the sol, aluminosilicate binder, pH stabilizer, strength enhancer or polymerization rate enhancer.

In an embodiment, the coating process includes coating the heated core in a mixer and then adding the sol, aluminosilicate binder, pH stabilizer, strength enhancer or polymerization rate enhancer while exposing them to a heat gun or other source.

In a preferred embodiment, the coating is the hardened reaction product or hardened geopolymer prepared from (a) silica or a silicate; (b) an alkali hydroxide or alkali oxide; (c) an aluminosilicate binder; and (d) at least one member selected from a pH stabilizer, strength enhancer or polymerization rate enhancer selected from aluminum trichloride, zinc chloride, an alkaline earth oxide or hydroxide such as calcium oxide, calcium hydroxide and/or magnesium oxide, an oxide of a transition metal and a weak organic acid or anhydride, such as acetic acid, acetic anhydride, citric acid or an ester thereof that decomposes to make an acid under in-situ conditions.

In a preferred embodiment, the silica and/or silicate is made into a sol in the presence of the alkali hydroxide or alkali oxide. The mole ratio of alkali metal hydroxide or alkali metal oxide (e.g. $Na_2O$ or $K_2O$) to $SiO_2$ in forming the sol ranges from about 1:1 to about 6:1; alternatively, from about 1:1 to about 7:1. Suitable ratios include, but are not necessarily limited to, about 3.2:1 and about 5.4:1; either of which may be suitable alternative lower or upper thresholds of a range.

The sol is then combined with the aluminosilicate binder and any of the pH stabilizer, strength enhancer or polymerization rate enhancers.

The mole ratio of silica or silicate and aluminosilicate binder in forming the coating is typically from about 0.1:1 independently to about 30:1; alternatively from about 1:1 independently to about 6:1.

The coating may be formed onto the proppant core or sand control particulate in the exothermic polymerization reaction between the silica and/or silicate of the sol and aluminosilicate binder. Hardening occurs during the exothermic reaction. The pH stabilizer, strength enhancer and/or polymerization rate enhancer may be a component of the reaction product.

The pH stabilizer, strength enhancer, and/or polymerization rate enhancer may be applied onto the surface concurrently with the sol and aluminosilicate binder or may be introduced onto the core during the hardening of the sol and aluminosilicate binder. Alternatively, the pH stabilizer, strength enhancer and/or polymerization rate enhancer may be admixed with the aluminosilicate binder and applied onto the proppant or sand control particulate core after application of the sol. If needed, the resulting composite may be put into an oven to finish the polymerization process.

In an embodiment, the composite may be prepared by first preparing an aqueous sol of a mixture of an alkali activated silica, alkali oxide, alkali hydroxide (sodium oxide, potassium oxide, sodium hydroxide or potassium hydroxide being preferred). The sol may be combined with the aluminosilicate binder and the mixture then applied onto the surface of the core or particulate.

In an embodiment, the pH stabilizer is the aluminum trichloride and/or weak organic acid, salt, anhydride or an ester thereof that decomposes to make an acid under in-situ conditions, or a combination. In a preferred embodiment, the pH stabilizer is added to the sol and aluminosilicate binder prior to hardening or during hardening. When aluminum trichloride, zinc chloride and/or weak organic acid, salt, anhydride or ester thereof is used, it may be introduced during the coating process as a liquid, solid or liquid and solid together.

In a preferred embodiment, the sol and aluminosilicate are first applied onto the core and the aluminum trichloride and/or weak organic acid, salt, anhydride or ester thereof is applied onto the core during hardening of the sol and aluminosilicate.

The pH stabilizer may be a component of the mixture wherein the mixture is applied onto the core. For instance, the mixture of sol, aluminosilicate binder and aluminum trichloride and/or zinc chloride or weak organic acid, salt, anhydride or ester thereof may be spread onto the surface of the core, the sol and aluminosilicate binder then being subjected to a sol-gel exothermic reaction.

Alternatively, the pH stabilizer may be sprayed onto the surface of the core after or while the sol and aluminosilicate binder are being applied onto the core. In an embodiment, the pH stabilizer may be applied onto the core during the hardening of the sol and aluminosilicate binder.

In an embodiment, the aluminum trichloride/zinc chloride/weak organic, salt, anhydride or ester thereof may be a component of the mixture of sol and aluminosilicate binder and, after the mixture is applied onto the surface of the core, additional aluminum trichloride, zinc chloride and/or weak organic acid, salt, anhydride or ester thereof may then be applied onto the core during hardening of the sol and aluminosilicate binder. For instance, aluminum trichloride may be applied onto the wet core after the addition of the sol and aluminosilicate (and optionally the transition metal oxide and/or alkaline earth oxide or hydroxide and/or zinc chloride) is spread onto the core in the reactor.

In another embodiment, the silica/silicate sol may be first applied onto the surface of the proppant or sand control particulate. A mixture of the aluminosilicate binder and aluminum trichloride, zinc chloride and/or weak organic acid, salt, anhydride or ester thereof may then be applied onto the surface of the core. Additional aluminum trichloride may then be applied onto the core during the hardening of the sol and aluminosilicate binder.

Typically, the amount of aluminum trichloride or weak organic acid, salt, anhydride or ester thereof, when present, in the composite is an amount sufficient to provide a pH from about 6 to about 9 to an aqueous fluid containing the composite. In an embodiment, the amount may be dependent on the amount of alkali hydroxide or oxide used to prepare the sol. For example, the molar ratio of the aluminum trichloride or weak organic acid, salt, anhydride or ester thereof to the alkali hydroxide or oxide in the composite may be from about 1:4, preferably from about 1.5:3.5.

The presence of the aluminum trichloride/weak organic acid, salt anhydride or ester thereof in the coating further has been shown to increase the strength of the proppant or sand control particulate compared to the pristine proppant or sand control particulate. As such, the proppant or sand control particulate of the composite demonstrates much greater strength than the uncoated proppant or sand control particulate.

The pH of the coating may further be neutralized by including a transition metal oxide and/or zinc chloride in the coating. The transition metal oxide and/or zinc chloride may function as a pH enhancer for the carrier fluid as well as a strength enhancer for the proppant or sand control particulate core. In an embodiment, the zinc chloride reacts with the alkali oxide or hydroxide of the sol to produce zinc oxide.

Further, the transition metal oxide and/or zinc chloride may function as a polymerization rate enhancer. As such, hardening of the silica and/or silicate with the aluminosilicate proceeds at a much faster rate in the presence of the transition metal oxide and/or zinc chloride.

In an embodiment, zinc chloride may be a preferred polymerization rate enhancer since, in the presence of an alkali metal hydroxide, zinc oxide may be formed; the zinc oxide being the reaction product of the alkali metal hydroxide and zinc chloride. Further, zinc chloride acts as a polymerization rate enhancer by generating heat upon reaction with water; the heat generated increases the rate of reaction. Since the exothermic reaction may occur by room temperature, the heat generated from the reaction may trigger the curing of the coating.

In an embodiment, the metal of the transition metal oxide of the polymerization rate enhancer may be a Group III to VIII metal and is preferably copper, titanium, zirconium, vanadium, niobium, chromium, molybdenum, tungsten, manganese, cobalt, iron, nickel or palladium as well as zinc. Zinc is particularly preferred.

When present, the amount of transition metal oxide and/or zinc chloride in the coating is between from about 1 to about 60, preferably from about 10 to about 40, wt. percent. Where the coating contains both aluminum trichloride/weak organic acid, salt, anhydride or ester thereof and transition metal oxide and/or zinc chloride, the molar ratio of the aluminum trichloride/weak organic acid, salt, anhydride or ester thereof and transition metal oxide and/or zinc chloride during the process is from about 2 to about 15, preferably from about 5 to about 12, wt. percent. Where the coating is not prepared in the presence of the aluminum trichloride or weak organic acid, salt, anhydride or ester thereof, the molar ratio between the transition metal oxide and/or zinc chloride and the aluminosilicate binder is from about 1 to about 75, preferably from about 10 to about 30, wt. percent. The presence of the transition metal oxide and/or zinc chloride further has been shown to increase the strength of the proppant or sand control particulate and thus decrease the generation of fines.

The transition metal oxide as well as the zinc oxide (upon reaction with the alkali oxide or hydroxide) is believed to react with the silica and/or silicate and aluminosilicate.

Typically, the transition metal oxide and/or zinc chloride is introduced into a mixture containing the silica and/or silicate.

Typically, the transition metal oxide and/or zinc chloride is added to a mixture of the sol and the aluminosilicate binder. The resulting mixture may then be applied onto the surface of the proppant or sand control particulate core. The mixture may then be subjected to low temperature heating to initiate polymerization through a sol-gel exothermic reaction to generate the aluminosilicate geopolymer from the reaction between the sol, aluminosilicate binder and transition metal oxide and/or zinc chloride onto the proppant core or sand control particulate. The rate of hardening or curing is increased by the presence of the transition metal oxide and/or zinc chloride (which forms zinc oxide). In an embodiment, the polymerized reaction product is that resulting between the sol, aluminosilicate binder and transition metal oxide and/or zinc chloride.

If desired, the mixture may further contain aluminum trichloride or weak organic acid, salt, anhydride or ester thereof or aluminum trichloride or weak organic acid, salt, anhydride or ester thereof or a combination may be added onto the surface of the proppant or sand control particulate core during hardening of the mixture.

When the coating is a geopolymer, an alkaline solution is required to cause the geopolymerization reaction. While the alkaline could be the monovalent alkali metal hydroxide (such as potassium hydroxide, sodium hydroxide, and the like) used to create the sol, the rate of reaction between the silica and/or silicate and aluminosilicate may further proceed faster when the reaction is conducted in the presence of an alkaline hydroxide or oxide. The hydroxide and/or oxide is preferably calcium. The alkaline oxide may react with the silica and/or sodium silicate sol to form calcium silicate on the surface of the proppant or sand control particulate.

The divalent metal hydroxide or oxide is especially preferred in those situations where the fluid containing the sol and aluminosilicate binder with the pH stabilizer and/or strength is too viscous to be effectively applied onto the surface of the core. In such instances, the alkaline hydroxide and/or alkaline oxide enhances the rate of polymerization between the aluminosilicate binder and sol.

In an embodiment, aluminum trichloride may be included in the coating with the alkaline hydroxide and/or alkaline oxide, sol and aluminosilicate binder. The aluminum trichloride may be applied onto the surface of the core during hardening of the sol and aluminosilicate binder.

In another preferred embodiment, a transition metal oxide may be combined with the alkaline hydroxide and/or alkaline oxide, sol and aluminosilicate (and optionally aluminum trichloride).

When present, the amount of coating added onto the core is from about 1 wt % to about 25 wt %, preferably from about 2 wt % to about 15 wt %, based on the total weight of the sol and aluminosilicate binder.

In a preferred embodiment, the proppant or sand control particulate core is first mixed with the silica or sodium silicate sol to provide a uniform wetness on the surface of the core. A mixture of the aluminosilicate and pH stabilizer, strength enhancer and/or polymerization rate enhancer may then be introduced onto the wet core and the coating hardened. Where a transition metal oxide and/or zinc chloride and/or alkaline earth hydroxide or oxide is being applied onto the surface of the core, aluminum trichloride may be applied with transition metal oxide and/or zinc chloride and/or alkaline earth hydroxide or oxide or subsequent thereto. In the latter, aluminum trichloride may be applied as a liquid solution (preferably as a mist) onto the surface of the core during the hardening of the sol, aluminosilicate binder and, optionally, transition metal oxide and/or zinc chloride and/or alkaline earth hydroxide or oxide. The coating may then be fully cured.

In another preferred embodiment, the composite is prepared by a sol-gel exothermic reaction wherein the proppant core is first combined with a slurry comprising (i) sodium silicate and/or silica; (ii) aluminosilicate binder; (iii), a transition metal oxide (such as zinc oxide) and/or zinc chloride and/or alkaline earth hydroxide or oxide; and (iv) alkali hydroxide and the slurry then applied onto the core. The slurry is hardened onto the core while adding onto the core dry aluminum chloride and/or zinc chloride. Water may then be sprayed onto the core during hardening of the slurry. The composite with hardened coating may then be fully cured. The exothermic reaction between dry or powdered aluminum trichloride and/or zinc chloride and water assists the curing process and provides a more uniform coating on the surface of the core.

In some cases, it may be desirable to pre-heat the sol and/or aluminosilicate binder solution prior to applying the same onto the core. In other instances, it may be desirable to heat the core prior to applying the sol, aluminosilicate binder, pH stabilizer, strength enhancer and/or polymerization rate enhancer onto the surface of the core. In such cases, the temperature of the core may be between 0 to about 300° C. when any or all of the components of the coating are applied.

In an embodiment, the composite may be prepared by applying onto the proppant core or sand control particulate a sol containing a compound selected from the group consisting of an alkali metal hydroxide/silica, alkali silicate (including that resulting from the reaction of the silica/silicate and alkali metal hydroxide in the sol), alkali metal phosphate, a phosphoric acid, ammonium phosphate and combinations thereof and a binder solution made of an alkaline earth metal hydroxide, an alkaline earth metal oxide, a metal oxide, a metal hydroxide, an aluminosilicate, and combinations thereof In another embodiment, a strengthened proppant may be prepared by mixing together an alkali phosphate or phosphoric acid to form an aqueous/gelatinous solution and a metal oxide in the presence of water. The metal oxide is sparsely soluble in water and will react with the alkali phosphate or phosphoric acid to form an aqueous/gelatinous solution. The solution is then coated onto the core. The pH stabilizer, strength enhancer and/or polymerization rate enhancer may be added to the solution prior to being coated onto the core or may be added onto the core during hardening of the phosphate. Polymerization may occur at room temperature or by exposing the solution-coated core to heat in an oven or another heat source, such as a heat gun.

In a preferred embodiment, the mole ratio between the acidic solution (sometimes termed "the compound") and the binder in forming the CBPC from about 0.1:1 independently to about 30:1; alternatively from about 1:1 independently to about 6:1.

In a preferred embodiment, phosphate ceramic binders may be prepared by the reaction of an alkaline phosphate solution including, but not limited to $KH_2PO_4$ and a binder source through a sol-gel exothermic reaction concurrently or prior to the addition of the pH stabilizer, strength enhancer and/or polymerization rate enhancer. With respect to phosphate ceramic binder and other materials, an acidic solution and sparsely soluble oxide are required to cause the reaction.

Chemically bonded phosphate ceramics are typically generated by an acid/base reaction of an acidified phosphate or phosphoric acid and a sparsely soluble metal oxide.

Further, the composites may be prepared by the addition of a filler that actively participate with the components of the reaction. Such fillers include, but are not necessarily limited to, fly ash and wollastonite and the like. The ratio of filler to reaction components (acidic solution and binder) can vary between about 1 independently to about 80 wt. % of the total mass of solid material used in the reaction; alternatively between about 5 independently to about 70 wt. %. In an embodiment, the acidic solution may be acidic because of the presence of an alkali metal phosphate, phosphoric acid or ammonium phosphate, ammonium di-hydrogen phosphate or the like. The sparsely soluble oxide can be any alkaline earth metal oxide, alkaline earth metal hydroxide, a metal hydroxide, a metal oxide or an aluminosilicate and the like. In an embodiment, the metal of the oxide or hydroxide is aluminum, silicon, zirconium, titanium, niobium, magnesium, manganese, calcium or a combination thereof. Sparsely soluble means that the oxide has low solubility in water or solubilizes very slowly in water. The reaction occurs between the acidic solution and the solubilized binder until the majority of the components (acidic solution and binder) are spent and transformed to the chemically bonded phosphate ceramics.

In another embodiment, it is desirable to etch the surface of the proppant or sand control particulate core prior to applying the sol to the surface. Typically, etching can be performed by mildly scrubbing the surface of the core with an alkaline hydroxide, such as sodium hydroxide or potassium hydroxide. Such scrubbing generates hydroxyl groups on the surface of the core. Reaction of the surface of the core with the sol is thereby enhanced.

By dramatically increasing the strength of the proppant or sand control particulate, use of the proppant or sand control particulate (in the form of the composite) may be extended to formation closure stresses of at least about 5000 psi (34 MPa), alternatively at least to about 6,000 psi (41 MPa), alternatively at least to about 8,000 (55 MPa) and in another non-limiting embodiment to about 10,000 psi (69 MPa), alternatively at least to about 12,000 psi (83 MPa), alternatively at least to about 14,000 psi (97 MPa) and even up to 18,900 psi (130 MPa). In one non-limiting embodiment, the compressive strength ranges from about 35 to about 130 MPa, alternatively from about 50 to about 100 MPa, and in another non-restrictive embodiment from about 60 to about 83 MPa. At such closure stresses, the composite will generate less fines than a pristine proppant or sand control particulate. Thus, the spalling of fines is minimized at using the composite as proppant or sand control particulate.

The apparent density of the composite may be less than the apparent density of the core. Apparent density as referenced herein may be determined using the American Petroleum Institute standard API-RP-19C.

In one non-limiting embodiment, the core may have an apparent density greater than or equal to 2.5 and alternatively greater than or equal to 2.65 g/cm$^3$. For example, sand has an apparent density of approximately 2.65 g/cm$^3$. The apparent density of a composite having a core of sand is typically between about 2.3 to about 2.63 g/cm$^3$, alternatively from between about 2.55 to about 2.6 g/cm$^3$; in another non-restrictive version from about 2 to about 2.61 g/cm$^3$. In another non-limiting embodiment, the apparent density of composites chemically bonded with aluminosilicates or CBPCs and other materials described herein ranges from about 1.8 to 2.5 g/cm$^3$.

In another non-limiting embodiment, the proppant or sand control particulate core may be a relatively lightweight or substantially neutrally buoyant particulate material or a mixture thereof. Such materials may be chipped, ground, crushed, or otherwise processed By "relatively lightweight" it is meant that the solid particulate has an apparent specific gravity (ASG) which is less than or equal to 2.45, including those ultra lightweight materials having an ASG less than or equal to 2.25, alternatively less than or equal to 2.0, in a different non-limiting embodiment less than or equal to 1.75, in another non-limiting embodiment less than or equal to 1.5, and in another non-restrictive version less than or equal to 1.25 and often less than or equal to 1.05.

Suitable relatively lightweight solid particulates are those disclosed in U.S. Pat. Nos. 6,364,018; 6,330,916; and 6,059,034, all of which are herein incorporated by reference.

Naturally occurring solid particulates include, but are not necessarily limited to, nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles may be formed by crushing, grinding, cutting, chipping, and the like.

Other solid particulates for use herein include beads or pellets of nylon, polystyrene, polystyrene divinyl benzene or polyethylene terephthalate such as those set forth in U.S. Pat. No. 7,931,087, also incorporated herein by reference.

Exemplary cores may include white sand, brown sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

Examples of ceramics include, but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant or sand control particulate core include, but are not limited to, Arizona sand, Wisconsin sand, Badger sand, Brady sand, and Ottawa sand. In a non-limiting embodiment, the solid particulate may be made of a mineral such as bauxite which is sintered to obtain a hard material. In another non-restrictive embodiment, the bauxite or sintered bauxite has a relatively high permeability such as the bauxite material disclosed in U.S. Pat. No. 4,713,203, the content of which is incorporated by reference herein in its entirety.

Where the coating is applied to relatively lightweight proppant or sand control particulates, such as a proppant or sand control particulate having an ASG greater than or equal to 1.75, the strength of the proppant or sand control particulate is enhanced while low apparent density is maintained.

The coating will also increase the temperature tolerance of the polymer proppant or sand control particulate core. By "tolerance" is meant that the composite maintains its structural integrity, that is, it does not break down into smaller fragments up to at least this temperature, or when it contacts chemicals up to at least this temperature.

The coating may include, but not necessarily be limited to, aluminosilicate, magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphate, carbide materials such as tungsten carbide, cements, polymer cements, high performance polymer coatings such as polyamide-imide and polyether ether ketones (PEEK), and combinations thereof. "High performance polymers" means that they have high temperature tolerance (more than 150° C.) and are chemically resistant.

The amount of the coating on the proppant or sand control particulate core ranges from about 0.5 wt % to about 30 wt % or higher; alternatively from about 0.5 wt % to about 15 wt %; and alternatively from about 1 wt. % to about 8 wt. % by weight of the core. Suitable amounts include, but are not necessarily limited to, about 2 wt %, about 4 wt %, about 5 wt %, about 8 wt %, and about 15 wt %, any of which may serve as a suitable lower or upper threshold of a proportion range.

In an embodiment, the composite withstands a closure stress up to about 8,000 psi when the coating ranges from about 5 to about 9 wt. percent of the weight of the core, up to about 10,000 psi when the coating ranges from about 1 to about 15 wt. percent of the weight of the core and alternatively, up to about 12,000 psi when the coating ranges from about 1 to about 20 wt. percent of the weight of the core.

The thickness of the coating may range from about 2 independently to about 120 microns, alternatively from about 50 independently to about 80 microns, over a relatively wide range, in another non-limiting embodiment. Thickness of the coating has been shown to significantly increase the strength and crush resistance of the proppant or sand particulate core. As stated herein, the coating protects the particle from crushing, helps resist embedment, and prevents the liberation of fines.

Exemplary cores may include sand, including white sand and brown sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

Examples of ceramics include, but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant or sand control particulate core include, but are not limited to, Arizona sand, Wisconsin sand, Badger sand, Brady sand, and Ottawa sand. In a non-limiting embodiment, the solid particulate may be made of a mineral such as bauxite which is sintered to obtain a hard material. In another non-restrictive embodiment, the bauxite or sintered bauxite has a relatively high permeability such as the bauxite material disclosed in U.S. Pat. No. 4,713,203, the content of which is incorporated by reference herein in its entirety.

In an embodiment, the strengthened proppant or sand control particulate may be composed of a core selected from the group consisting of sand, including white sand and brown sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof, and a coating at least partially covering the proppant core, where the coating is selected from the group consisting of aluminosilicate, magnesium phosphate, calcium phosphate, aluminum phosphate, zirconium aluminum phosphate, zirconium phosphate, zirconium phosphonate, magnesium potassium phosphate, potassium aluminum phosphate, alkali metal phosphates, carbide materials such as tungsten carbide, cements, polymer cements, high performance polymer coatings such as polyamide-imide and polyether ether ketones (PEEK), and combinations thereof.

In an embodiment, the strengthened proppant or sand control particulate may be prepared by mixing together (a) a compound selected from the group consisting of an alkali metal phosphate, phosphoric acid, ammonium phosphate, ammonium di-hydrogen phosphate, and combinations thereof, and (b) a binder selected from the group consisting of an alkaline earth metal hydroxide, an alkaline earth metal oxide, a metal oxide, a metal hydroxide, an aluminosilicate, and combinations thereof in water to form an aqueous solution; at least partially coating a plurality of proppant cores with the aqueous solution; and exposing the aqueous solution-coated proppant cores to a temperature to polymerize the (a) compound selected from the group consisting of an alkali metal phosphate, a phosphoric acid, ammonium phosphate, and combinations thereof and (b) binder selected from the group consisting of a metal oxide, a metal hydroxide, an alkaline earth metal hydroxide, an alkaline earth metal oxide, an aluminosilicate, and combinations thereof to form a coating where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphates, carbide materials, tungsten carbide, cements, polymer cements, polyamide-imides, polyether ether ketones (PEEK), and combinations thereof, to give the strengthened proppant.

Optionally boric acid and/or borax may be used as a retarder to slow down the reaction.

There may also be provided coated proppants prepared by a method of mixing together a phosphoric acid or an alkali phosphate, a filler consisting essentially of an aluminosilicate such as fly ash or wollastonite, and a metal oxide in the presence of water to form an aqueous gelatinous solution, and heating the aqueous solution-coated proppant cores to polymerize the compound and the binder.

In a preferred embodiment, the composite is a strengthened proppant or sand control particulate having an aluminosilicate (geopolymer) coated onto at least a portion of the proppant or sand control core.

In some instances, it is desirable to pre-heat the mixing vessel prior to introducing the proppant or sand control particulate core and/or coating components into the mixer. When desired, the mixing vessel may be pre-heated to a temperature between from about 20 to about 250° C.

In a preferred embodiment, mixing vessel, into which the coating is applied onto the proppant or sand control particulate core, is a bowl-shaped mixer having a curved bottom. The bowl is at a 45 degree angle from the point of introduction of the components which form the composite. Such reactors enhance the formation of a homogeneous coating onto the surface of the proppant or sand control particulate core.

A suitable temperature range to further complete or cure the polymerization of the coating may range from about 20° C. to about 300° C.; alternatively from about 25° to about 200° C. In some instances the binder is not completely solubilized and some of the particles that did not solubilize become encapsulated in the ceramics acting as a reinforcing agent increasing the strength of the material. These inorganic polymers are considered "green" or environmentally advantageous, because they are synthesized from natural resources and their chemistry does not adversely affect the environment.

When the coating is a geopolymer, an alkaline solution is required to cause the geopolymerization reaction. This could be the monovalent alkali metal hydroxide including potassium hydroxide, sodium hydroxide, and the like. If a divalent alkali metal hydroxide is used, the solubility will decrease and some amount of a monovalent alkali metal hydroxide may be necessary or helpful in order to initiate the reaction combinations thereof.

The size of the composite may be any size suitable for use in a fracturing treatment of a subterranean formation or a sand control operation. The optimal size of the composite may be dependent on in situ closure stress. In an embodiment, the composites may have a particle size of less than about 1 micron, less than about 0.5 micron, or less than about 0.1 micron. In an embodiment, the composites may have a particle size of about 10 nanometers to about 500 nanometers, about 20 nanometers to about 100 nanometers or about 20 nanometers to about 40 nanometers. As used herein, "size" refers to the largest linear dimension, e.g., a diameter in a spherical particle.

Suitable shapes for the composites include, but are not necessarily limited to, beaded, cubic, bar-shaped, cylindrical, rod-shaped or a mixture thereof. Shapes of the proppant or sand control particulates may vary, but in one embodiment may be utilized in shapes having maximum length-based aspect ratio values, in one exemplary embodiment having a maximum length-based aspect ratio of less than or equal to about 25, alternatively of less than or equal to about 20, alternatively of less than or equal to about 7, and further alternatively of less than or equal to about 5. In yet another exemplary embodiment, shapes of such composites may have maximum length-based aspect ratio values of from about 1 to about 25, alternatively from about 1 to about 20, alternatively from about 1 to about 7, and further alternatively from about 1 to about 5. In yet another exemplary embodiment, such composites may be utilized in which the average maximum length-based aspect ratio of particles present in a sample or mixture containing only such particles ranges from about 1 to about 25, alternatively from about 1 to about 20, alternatively from about 2 to about 15, alternatively from about 2 to about 9, alternatively from about 4 to about 8, alternatively from about 5 to about 7, and further alternatively is about 7.

In one embodiment, the composite used may have a beaded shape or spherical shape and a size of from about 4 mesh to about 300 mesh, alternatively from about 8 mesh to about 140 mesh, alternatively from about 12 mesh to about 60 mesh, alternatively from about 16 mesh to about 40 mesh, and alternatively about 20/40 mesh. Thus, in one embodiment, the composite may range in size from about 1 or 2 mm to about 0.1 mm; alternatively their size will be from about 0.2 mm to about 0.8 mm, alternatively from about 0.4 mm to about 0.6 mm, and alternatively about 0.6 mm. However, sizes greater than about 2 mm and less than about 0.1 mm are possible as well.

The composite is preferably a sphere having a Krumbein sphericity (API-RP-19C) of at least about 0.5, alternatively at least about 0.6; and a roundness (Sloss Chart) of at least about 0.4, alternatively at least about 0.6.

The physical properties of the composite are largely determined by the ratio of the compounds and binder(s). By varying this ratio, the material may be made rigid, suitable for use as a concrete, cement, or waste encapsulating medium, or more flexible for use as an adhesive, sealant or as an impregnating resin. The coating process is similar to that of resin coated sand and is accomplished by coating heated core in a mixer, such as a rotary mixer, with the solution and including the compound and the binder when exposing the sample to a heat gun or other heat source for less than about ten minutes to trigger polymerization.

In an embodiment, the surface of the composite may be modified to render the composite hydrophobic, hydrophilic or oleophobic. In an embodiment, a ratio of formation surfaces that are water wet relative to formation surfaces that are oil wet may correspond to a proportion of the hydrophilic composites to hydrophobic composites in produced fluid to provide information about the wettability of the formation surfaces In an exemplary embodiment, the composite may be rendered hydrophobic by modifying the surface of the composites with an aliphatic group, an oil or a fat. Surface modified means that the aliphatic groups are bonded to the surface of the composite or physically associated with the surface. In an embodiment, the aliphatic groups are bonded to the surface of the composite via a functional group, for example a carboxylate group.

For example, the composite may be modified with a $C_6$-$C_{30}$ aliphatic group including $C_{10}$-$C_{28}$ as well as $C_{12}$-$C_{25}$ aliphatic group. As used herein, "aliphatic group" means a saturated or unsaturated linear or branched hydrocarbon group. A hydrocarbon group refers broadly to a substituent comprising carbon and hydrogen, optionally with 1 to 3 heteroatoms, for example, oxygen, nitrogen, halogen, silicon, sulfur, or a combination thereof. An aliphatic group may be an alkyl, alkenyl, or alkynyl group, for example.

In another embodiment, the hydrophobic composite may be prepared by modifying the surface of the composite with a fatty acid. The fatty acid can be saturated or unsaturated. A mixture of different fatty acids can be used. Exemplary fatty acids include caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing.

An exemplary process for preparing the hydrophobic composite may include dissolving the modifying agent having an aliphatic tail and a head in a solvent. The tail may contain the $C_6$-$C_{30}$ or $C_{12}$-$C_{25}$ aliphatic group. The head may contain a functional group such as a carboxylic acid group. The composite may then be introduced to the solution containing the modifying agent. The composite may in a powder form or, alternatively, may be first dissolved or dispersed in a solvent to form a solution or dispersion. After the modifying agent is combined with the composite in the presence of a solvent, the mixture may be mixed for a sufficient amount of time such that the head of the modifying agent bonded or attached to the surface of the composite.

In like manner, the composites may be rendered hydrophilic by reacting the surface of the composite with an alcohol.

In some embodiment, a modifying agent may be used which imparts both hydrophobic and oleophobic properties to the composite. For instance, the modifying agent may be an organo-silicon containing material or a fluorinated alkyl.

In an embodiment, the organo-silicon containing material may be a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

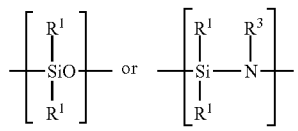

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1_{4-x}SiA_x$ may be hydrogen, a halogen such as chloride, OH, $OR^2$ or

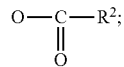

wherein B in the above structural formula may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3, y is 1 or 2.

In an embodiment, $R^1$ may be a fluoro-substituted hydrocarbon. Preferred as fluoro-substituted hydrocarbons are those of the structure:

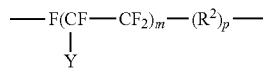

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

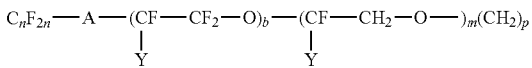

where A is an oxygen radical or a chemical bond; n is 1 to 6, Y is F or $C_nF_{2n+1}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$:PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—(CFY—CF$_2$)$_m$ where Y is F or C$_n$F$_{2n+1}$; m is 4 to 20 and n is 1 to 6.

Examples of perfluoroalkylene ether groups are those of the structure:

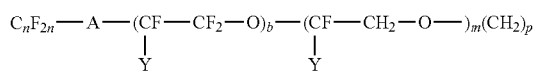

where A is an oxygen radical or a chemical bond; n is 1 to 6, Y is F or C$_n$F$_{2n+1}$; b is 2 to 20, m is 0 to 6, and p is 0 to 18, preferably 2 to 4 and more preferably 2.

Preferred fluorinated materials are esters of perfluorinated alcohols such as the alcohols of the structure F—(CFY—CF$_2$)$_m$—CH$_2$—CH$_2$—OH where Y is F or C$_n$F$_{2n+1}$; m is 4 to 20 and n is 1 to 6.

Further preferred as fluorinated hydrocarbons are perfluorinated hydrocarbons of the structure R$_f$—(CH$_2$)$_p$—X where R$_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure R$_f$—(CH$_2$)$_p$—Z where R$_f$ and p are as defined above, preferably R$_f$ is a perfluoroalkylene ether group such as those described above, and p is from 2 to 4, and Z is a phosphorus acid group. Exemplary phosphorus acid groups are:

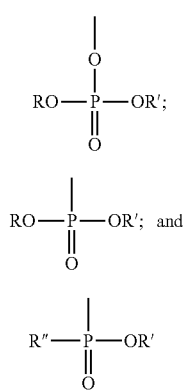

where R" is a hydrocarbon or substituted hydrocarbon radical having up to 200, such as 1 to 30 and 6 to 20 carbons, R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In another embodiment, the surface modifying treatment agent imparts at least one of the following properties to the composite: magnetism, isolator or packer (resistivity enhancer), wettability alteration or electrical conductivity. As such, the composite may be used to enhance recovery of oil and/or gas from the well.

Typically, nanoparticles are used to alter the properties of the composite. For instance, the coating may contain magnetic nanoparticles including those nanoparticles which are naturally magnetic as well as nanoparticles which may be chemically or otherwise altered to become magnetic. For example, the nanoparticles could be a magnetic particle, e.g., ferromagnetic, ferrimagnetic, superparamagnetic, paramagnetic, diamagnetic, etc. In an embodiment, the coating may contain a magnetic polymer or a a metallic such as iron, cobalt, nickel, silver, platinum, titanium, aluminum, copper, zinc, zirconium, or a rare earth metal like gadolinium, dysprosium, praseodymium, holmium, holmium/yttrium alloy, Sm alloys with Co, Fe, Cu and Zr, alloys of neodymium, iron and boron, iron alloys which in addition to iron are composed of aluminum, nickel and cobalt, iron oxide, ferrites, manganese-zinc ferrite, nickel-zinc ferrite and the like. In another embodiment, the nanoparticles are carbon nanotubes or graphene (especially for enhancing electrical conductivity) or barium titanate or strontium titanate (especially for enhancing resistivity). The nanoparticle may further be functionalized with hydrophilic and/or hydrophobic functional groups to adjust their wettability by the fluids and to maintain their colloidal stability. For example, carbon coating generally improves the dispersal of inorganic nanoparticles with in hydrophobic liquids and can enable further functionalization.

The composites may be employed with carrier or treatment fluids in order to facilitate placement of the composite to a desired location within the formation. The composites may be introduced into the wellbore at any concentration deemed suitable or effective for the downhole conditions to be encountered. The composite may be introduced as part of a treating fluid into a well down wellbore tubulars (e.g., tubing, workstring, casing, drill pipe) or down coiled tubing, for example at concentrations of about 0.25 to about 15 pounds per gallon of carrier fluid.

Any carrier fluid suitable for transporting the composite into a well and/or subterranean formation fracture in communication therewith may be employed including, but not limited to, carrier fluids including a completion or workover brine, salt water or brine, fresh water, potassium chloride solution, a saturated sodium chloride solution, liquid hydrocarbons or a gas or liquefied gas such as nitrogen or carbon dioxide.

The fluids may be gelled, non-gelled or have a reduced or lighter gelling requirement as compared to carrier fluids employed with conventional fracture treatment/sand control methods. The latter may be referred to as "weakly gelled", i.e., having minimum sufficient polymer, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid may contain no polymer or viscosifier.

The use of a non-gelled carrier fluid eliminates a source of potential proppant pack and/or formation damage and enhancement of well productivity. Elimination of the need to formulate a complex suspension gel may further mean a reduction in tubing friction pressures, particularly in coiled tubing and in the amount of on-location mixing equipment and/or mixing time requirements, as well as reduced costs.

The carrier or fracturing fluid may further contain one or more conventional additives to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

Additives, such as fillers, plasticizers, cure accelerators and retarders, and rheology modifiers may be used in the coating compositions described herein in order to achieve desired economical, physical, and chemical properties of the proppant or sand control particulate coating during the mixing of the chemical components, forming and cure of the particles, and the field performance of the coatings on the proppant or sand control particulates.

Compatible fillers include, but are not necessarily limited to, waste materials such as silica sand, Kevlar fibers, fly ash, sludges, slags, waste paper, rice husks, saw dust, and the like, volcanic aggregates, such as expanded perlite, pumice, scoria, obsidian, and the like, minerals, such as diatomaceous earth, mica, borosilicates, clays, metal oxides, metal fluorides, and the like, plant and animal remains, such as sea shells, coral, hemp fibers, and the like, manufactured fillers, such as silica, mineral fibers and mats, chopped or woven fiberglass, metal wools, turnings, shavings, wollastonite, nanoclays, carbon nanotubes, carbon fibers and nanofibers, graphene oxide, or graphite. In some non-limiting instances these fillers maybe part of the reaction.

The composites have particular applicability in fracturing operations of low permeability subterranean reservoirs such as those comprised primarily of coal, limestone, dolomite, shale, siltstone, diatomite, etc., known to be susceptible to fines generation due to their friable nature.

When used in hydraulic fracturing, the composites combined with the fluid are injected into the formation at pressures sufficiently high to cause the formation or enlargement of fractures, or to otherwise expose the composites to formation closure stress. In an embodiment, the composites form a pack having voids in the fracture. Any closure of the formation between the composites that occurs within the fracture will be held open and remain conductive by the composites bracing the fracture walls apart.

Where the composites are closely packed or multi-layered, the conductivity goes through the porosity defined and created by the packing of the composites and forming the proppant pack. Conductivity may also be provided from between the fracture face and the proppant pack.

In an embodiment, the composites may be used to form a partial monolayer. In such instances, the high conductivity of the created fractures is attributable to the ability of produced fluids to flow around the widely spaced composites instead of being confined to the relatively small interstitial spaces evidenced in the packed bed. The diameter of the composite is substantially similar to the width of the created fracture to be created.

The composite may withstand a closure stress of at least about 1000 psi (6.9 MPa), alternatively of at least about 5000 psi (34 MPa) or greater, up to 10,000 psi (69 MPa), even without the coating. However, with the coatings described herein, compression strength may range up to about 12,000 psi (83 MPa), and even up to 130 MPa (18,900 psi). In one non-limiting embodiment, the compressive strength ranges from about 35 to about 130 MPa, alternatively from about 50 to about 100 MPa, and in another non-restrictive embodiment from about 60 to about 83 MPa. However, it will be understood with benefit of this disclosure that these are just optional guidelines.

Since the composites withstand high reservoir closure stresses, they prevent the full closure of the facture, thereby enhancing fracture conductivity. The composite exhibits enhanced conductivity of fractures compared to a pristine proppant. (The term "pristine" as used herein refers to the uncoated proppant or sand control particulate. When referencing a pristine proppant or sand control particulate, it is understood that the pristine proppant or sand control particulate is the same as the core of the composite.)

In an embodiment, the proppant matrix or pack has a conductivity equal to or greater than 800 millidarcy feet (mdft), 300 mdft, 90 mdft, 20 mdft and 10 mdft at a pressure of about 1,000 psi, 2000 psi, 4000 psi, 6000 psi and 8,000 psi, respectively.

The strength of the composite further minimizes or prevents embedment of the composite into the rock at high stresses (typically in excess of 10,000 psi). Embedment of proppant into the formation decreases the width of the proppant pack. Embedment reduces proppant pack conductivity as the embedded proppant plugs pore throats of the pack with formation fines spalled from the rock displaced into the proppant pack. The reduction in fine generation thus enhances fracture conductivity.

In a preferred embodiment, the composites are deformable. By "deformable" it is meant that the composites of the pack substantially yield upon application of a threshold level to point to point stress. The in situ deformation of the composites form multi-planar structures or networks and thus serve as a cushion to prevent grain-to-grain contact and absorb stress. Such cushioning prevents the composite from shattering or breaking due to stress (including stress induced by stress cycling). The deformability of the composites attributes to less fines being generated and conductivity being maintained. Reduction in fines generation further permits the extension of the closure stress range in which the proppant pack may be used.

Fracture conductivity may be further increased by the placement of the composite to create a partial monolayer to support the fracture. Fractures containing partial monolayers exhibit vacant areas around and between the composites which thereby increases the relative conductivity of the propped fracture. The monolayer is created when the propped fracture has a width that is equal to one particle diameter with no remaining voids into which additional particles may be placed.

While the packing of a complete monolayer of composite is 2 pounds per square foot, the packing of a partial monolayer of the composite is typically between from about 0.02 to about 0.8 lbs. per sq. ft for the composite with ASG between 1.1 and 1.5. Such packing causes an increase in porosity of the fracture. The resulting partial monolayer of composite exhibits greater conductivity than that evidenced with the complete monolayer.

In one non-limiting embodiment, the composites may be useful for flow back control, particularly in the embodiment where the coating may be deformable—this may help the proppant stay in place. These materials may be used together with non-coated and pristine proppant particulates. It is expected that flowing fluid back through the composites where the amount of the proppants flowed back (through the composite) is less than the amount of otherwise pristine proppants flowed back. In one non-limiting version, the amount of proppants flowed back is reduced from about 10 wt % or more less proppant produced to 100 wt %; alternatively, the amount of proppants flowed back is reduced from about 20 wt % or more less proppant produced to 80 wt %.

In one non-limiting embodiment, the flexibility of the coating may be improved by including in the coating a hydratable polymer such as carboxyalkyl celluloses, like carboxymethyl cellulose and/or galactomannan gums, such as underivatized guar and/or guar derivatives and the like. These polymers are included in the structure of the coating and thus not available to be solubilized in the fracturing fluid.

Further, the composites may be used in a sand control method (such as gravel packing) for a wellbore penetrating a subterranean formation and may be introduced into the wellbore in a slurry with a carrier fluid. A screen assembly such as is known in the art may be placed or otherwise disposed within the wellbore so that at least a portion of the screen assembly is disposed adjacent the subterranean formation. A slurry including the composite in the carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the sand control method may use the composite in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The composites may be employed to simplify hydraulic fracturing treatments or sand control treatments performed through coil tubing, by greatly reducing fluid suspension property requirements. When placed downhole, the composite exhibits a much reduced propensity to settle (as compared to conventional proppant or sand control particulates), particularly in highly deviated or horizontal wellbore sections.

In this regard, the composites may be advantageously employed in any deviated well having an angle of deviation of between about 0° and about 90° with respect to the vertical. However, in one embodiment, the composite may be advantageously employed in horizontal wells, or in deviated wells having an angle with respect to the vertical of between about 30° and about 90°, alternatively between about 75° and about 90°.

The composite may further be utilized as particulate/ proppant material at more severe or demanding downhole conditions (e.g., at higher downhole temperatures and/or under higher downhole conditions of closure stress) than the conditions under which conventional particulates are suitably employed. The downhole temperatures may be greater than or equal to about 300° F.

The composites defined herein further exhibit a variety of features, some of which have already been mentioned. For instance:
- the composites reach their final mechanical properties by chemical reaction at low temperature (<300° C.);
- bonding type of the composites include a mixture of ionic, covalent and Van Der Waals bonding, with the ionic and covalent dominating;
- both density and compressive strength can be controlled with additives and processing; and
- the composites are thermally stable, which means that they do not decompose or come apart at high temperatures, even up to at least 800° C. In one non-limiting embodiment the high temperature range may be from about 40° F. to about 600° F. (about 4° C. to about 316° C.).

FIG. 1 illustrates a schematic, cross-sectional diagram of a coated proppant or sand control particulate 10 as described herein, where the proppant or sand control particulate core 12 is at least partially coated by a coating 14.

EXAMPLES

Crush resistant tests were performed according to the procedure detailed in API-RP-19C. The proppant materials were crushed at 6, 7, 8, 10 and 12 kpsi. 41.15 g of sieved, split proppant were loaded in the crush cell and crushed at a given stress level using an MTS hydraulic press (Model 561-324-01, with a capacity of 550 kpsi). The stress was increase at a rate of 2,000 psi/min. Once the desired stress was reached, the sample was maintained at stress for 2 min before release. The sample was then removed from the cell, weighed and sieved for 10 min (m) using the stack of sieves. The particles that fell below the lowest mesh size of the stack were weighed and calculated as fines ("$m_{pan}$"). For example for 20/40 mesh sand, any particles that fell below 40 mesh were considered fines. The weight % crush mass was determined using equation (2):

$$\text{wt. \%} = \frac{m_{pan}}{m} \times 100 \qquad (2)$$

where:
$m'_{pan}$ is the mass of fines generated in the test, in g; and
m is the total mass of proppant recovered from the cell including the fines, expressed in g.

Examples 1-3

Silica sand having particles size of 40/70 mesh was pre-heated in an oven and then transferred to a laboratory mixer. The silica sand used demonstrated a crush resistance rating, following API-RP-19C, of 5 k.

A sol made of a sodium silicate solution and a 12 N sodium hydroxide was added to the mixer and well spread on the surface of the sand. Dehydroxylated kaolin was then added, reacting with the silicate solution on the surface of the sand through a gelation step and a hardening step. During the hardening step, 19 ml of a 25 vol. percent sodium silicate solution was sprayed on the coated particles very slowly and over a 30 minutes time period. The coated sand was then removed from the mixer and cured at 300° F. in an oven. The resulting composite was then subjected to closure stresses of 8,000 and 11,000 psi. The results are shown in Table I; the pH refers to that of an aqueous fluid (approximately 7.0) to which was added the composite:

TABLE I

| Ex. No. | 1 | 2 | 3 |
|---|---|---|---|
| pH | 10.28 | 10.18 | 10.18 |
| Fines (wt. %) @ 8,000 psi | 6.16 | 7.97 | 7.21 |

Table I illustrates a crush resistance rating, API-RP-19C, of 8 k for the treated sand.

Examples 4-7

A 300 g of 40/70 mesh Silica sand (having a crush resistance rating, API-RP-19C, of 6 k) was pre-heated in an oven and then transferred to a laboratory mixer. Then a slurry made of a mixture of sodium silicate solution, aluminum trichloride, dehydroxylated kaolin and sodium hydroxide solution was spread on the surface of the sand particles. A sol-gel exothermic reaction occurred between the silica, dehydroxylated kaolin and sodium silicate. In (Example 7, the sand was pre-treated with a dilute solution of sodium silicate having a pH adjusted to 12.0. to etch the surface of the sand generating hydroxylated sites on the surface for better bonding of the coating.) The coated sand was then removed from the mixer and optionally cured in an oven. The resulting composite was then subjected to a closure stress of 8,000 psi. The results are shown in Table II, the pH refers to that of an aqueous fluid (pH 7.0) to which was added the composite:

TABLE II

| Ex. No. | 4 | 5 | 6 | 7 |
|---|---|---|---|---|
| Sodium Silicate solution (g) | 37.63 | 37.68 | 37.68 | 37.63 |
| NaOH (g)/3 g water | 6.58 | 6.918 | 7.99 | 6.58 |
| Dehydroxylated kaolin | 29.6 | 29.6 | 29.6 | 29.6 |
| $AlCl_3$ (g) | 0.20 | 0.57 | 1.77 | 4.00 |
| Curing temperature (F.)/Time (hrs.) | 150/18 | 150/18 |  | 300/18 |
| pH | 12.00 | 12.21 | 12.08 | 10.52 |
| Wt. % fines @8,000 psi | 5.90 | 5.90 | 4.70 | 4.40 |

Table II shows that increasing the amount of $AlCl_3$ from 0.2 to 4 g. decreased the amount of generated fines from 5.9 to 4.4% respectively. Etching the surface of the sand first provided with the least amount of fines and the lowest pH.

Examples 8-11

Sodium silicate solution, aluminum trichloride, dehydroxylated kaolin and sodium hydroxide were mixed in a mixing vessel. The mixture was then combined with 40/70 mesh sand classified as a 6K sand (API-RP-19C) and spread thoroughly on the surface of the sand. (The sand in Examples 10 and 11 was pre-treated with 10 ml of 10N sodium hydroxide to etch the surface and generate hydroxyl groups on the surface.). A sol-gel exothermic reaction occurred between the silicate and kaolin in the presence of sodium hydroxide solution. While hardening, a spray of aluminum chloride, sodium silicate or acetic acid was applied into the mixer and onto the coating. The coated sand was then removed from the mixer and calcined in an oven. The resulting composite was then subjected to closure stresses of 8,000 and 11,000 psi. The results are shown in Table III where the baseline is the control wherein the sand was not subjected to any processing and the pH refers to that of an aqueous fluid (pH 7.0) to which was added the composite and a temperature of 150° F. maintained for 3 hours:

TABLE III

| Ex. No. | Comp. Ex (Baseline) | 8 | 9 | 10 | 11 |
|---|---|---|---|---|---|
| Sodium Silicate solution (g) |  | 37.63 | 37.63 | 37.63 | 37.63 |
| NaOH (g) |  | 7.99 | 6.58 | 6.58 | 6.58 |
| Water (g) |  | 3 | 3 | 0 |  |
| Dehydroxylated kaolin |  | 29.6 | 24.6 | 29.6 | 29.6 |
| $AlCl_3$ (g) |  | 1.5 | 4.75 |  |  |
| Sodium silicate spray |  |  | 2.5 ml in 10 ml water |  |  |
| Acetic acid, spray operations |  |  |  | 30 ml/75 vol. %, 10 L solution | 50 ml/75 vol. %, 10 L solution |
| Sand, pretreated |  | No | No | Yes | Yes |
| Calcination temperature (F.) | 300 | 300 | 300 | 300 | 300 |
| Calcination Time (hrs.) | 72 | 72 | 72 | 18 | 18 |
| pH |  | 10.16 | 9.40 | 9.39 | 9.20 |
| wt. % fines @8,000 psi |  | 6.70 | 7.50 | 5.50 | 12.95 |

As shown in Table III, pH is decreased using either aluminum trichloride or sodium silicate. Table III also shows that the presence of aluminum trichloride or acetic acid was effective in stabilizing the pH of the composite in the neutral range even after 3 hours at 150° F. The ratio of $nSiO_2/nAl_2O_3$ was seen to affect the strength of the coating as demonstrated by the % fines. The optimum $nSiO_2/nAl_2O_3$ ratio was 3.3.

Example 12

About 300 g silica sand was pre-heated in an oven at 300° F. for 2 hours and then transferred into the reactor. A mixture of 36.6 g sodium silicate (having a $Na_2O:SiO_2$ weight ratio of 3:2), and 6.58 g of sodium hydroxide pellets and g of water was made. The mixture was added gradually to the sand, over about 30 to 60 seconds when the temperature of the sand was about 178° F. The liquid mixture was mixed to create a uniform wetness. A solid mixture of 29.6 g dehydroxylated kaolin and 4.5 alumina trichloride was then added to the sand for about 30 to 60 seconds until a uniform coating was created. The mixture was heated at 450° F. in a pre-heated oven for about 30 minutes to harden the coating. When added to an aqueous fluid (pH 7.0), a neutral and stable pH was maintained with clear visual turbidity. The % fines at 8000 psi crush resistance strength were low. The results are set forth in Table IV below:

TABLE IV

| pH/visual observation | 7.23/Clear |
|---|---|
| pH after 3 hr @ 150 (F.) | 8.83 |
| Fines (wt. %) @8,000 psi | 8.68 |

Table V compares the composite with uncoated sand (pristine sand). As demonstrate, the composite exhibits higher crush resistance.

TABLE V

| Ref | NS-233 | 40/70 silica sand- 5K |
|---|---|---|
| Crush Resistance @ 4000 psi, % | 8.68 | 6.95 |
| Crush Resistance @ 5000 psi, % | | 9.84 |
| Fines (wt. %) @8,000 psi | 8.68 | |

Example 13

Figure 2:
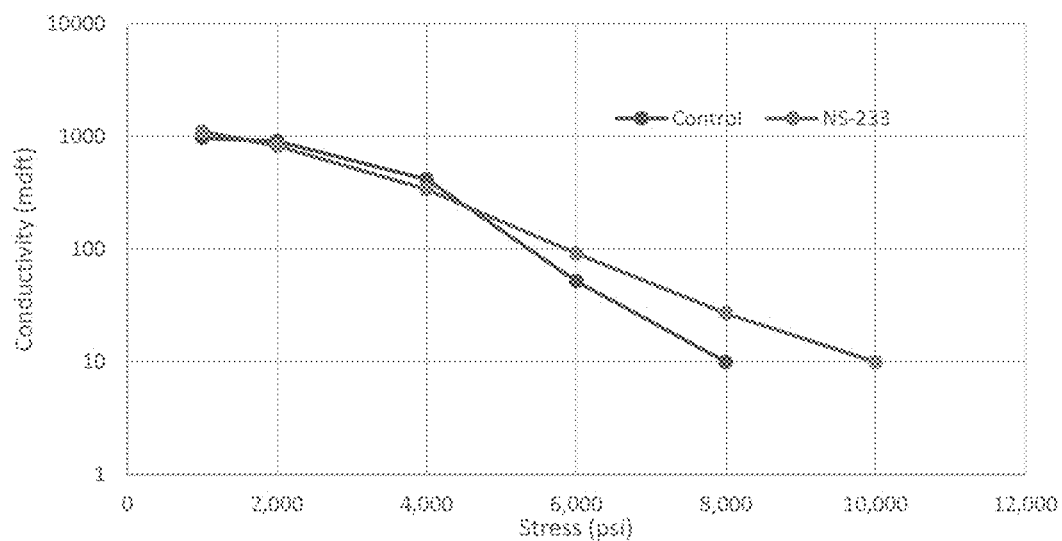
FIG. 2 contrasts the conductivity and closure stress between a composite having a sand core and a hardened coating prepared from sodium silicate, sodium hydroxide, an aluminosilicate and aluminum trichloride versus an uncoated (pristine) sand core.
Figure 3:
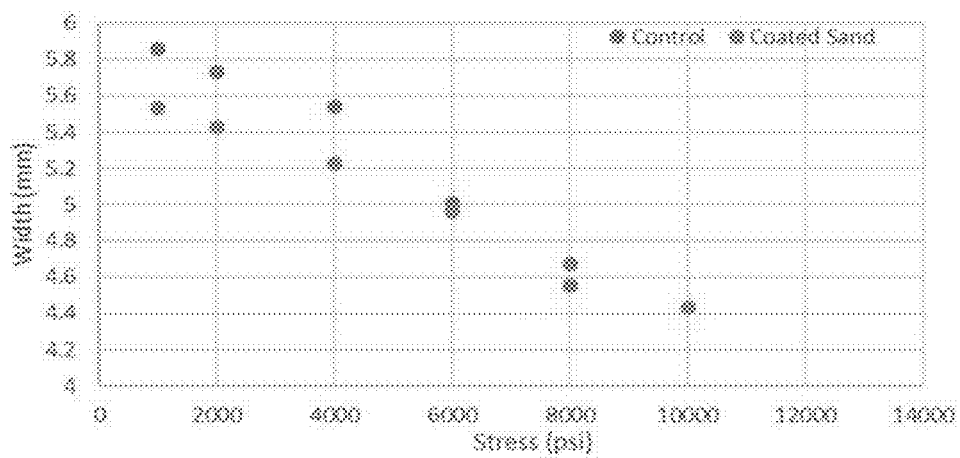
FIG. 3 contrasts the fracture width and closure stress between a composite having a sand core and a hardened coating prepared from sodium silicate, sodium hydroxide, an aluminosilicate and aluminum trichloride versus an uncoated (pristine) sand core.

Long term conductivity of the composite of Example 12 and uncoated (pristine) sand were determined according to ISO 13503-5/API-RP-19D at 250° F. and a loading of 2 lbs/ft$^2$. A closure stress was applied across the unit for 50±2 hours to allow the sample bed to reach a semi-steady state condition. As fluid was forced through the bed, the pack width, differential pressure, temperature and flow rates were measured at each stress. Pack permeability and conductivity were then calculated. The width of the pack was determined by assembling the conductivity cell with the Ohio sandstone wafers and shims without the sample. The distance between the width bars that are attached to each end of the conductivity cells was measured at each of the four corners and recorded. The cells were then disassembled and reassembled with the samples. Measurements were made again at the beginning and ending of each stress period. Width was determined by subtracting the average of the zero from the average of each of the stress width values. Conductivity was calculated using Darcy's equation. Multiple flow rates were used to verify the performance of the transducers, and to determine darcy flow regime at each stress; an average of the data at these flow rates was reported. The minimum pressure drop of 0.01 kPa (0.002 psi). At stipulated flow rates and temperature conditions, no appreciable non-darcy flow or inertial effects were encountered. After completing the rates at a closure stress level in all cells, the closure stress was increased to a new level; 50±2 hours was allowed for the bed to reach a semi-steady state condition, and multiple flow rates in all cells were introduced to gather data required to determine pack conductivity at this stress level. Conductivity was measured at 2,000, 4,000, 6,000, 8,000 and 10,000 psi. At low stress, up to about 5,000 psi, the conductivity of the coated sand and control are similar as illustrated in FIG. 2. However, as shown in FIG. 3, at these low stresses the width of the control sand is larger than that of the coated sand. At 5,000 psi the two conductivity curves cross and the coated sand has a higher conductivity than the control. The conductivity at 6,000 psi is twice of the control. The conductivity at 8,000 psi is 3 times higher.

Example 14

The surface of the composite of Example 12 was modified using a neutral wet surface treatment agent capable of changing wettability of the coated sand. In order to surface modify the coated sand, 1 wt. % of the surface modifier was added to the composite. The resulting composite was tumbled until dry. Mild heat (about 212° F.) was applied to ensure the water present in the surface modifier was driven out. This reaction was very quick and took less than 5 minutes to be complete. A drop of water was then applied onto the surface of the composite modified with the surface modifying agent. A water bead on the surface of the composite demonstrates the hydrophobic nature of the modified composite. The surface modifying agent provided the surface of the composite with hydrophobic and oleophobic properties.

Examples 15-19

These Examples illustrate improvement in the rate of a geopolymerization reaction using calcium hydroxide. About 300 g Silica sand of 40/70 mesh (and a crush resistance rating, API-RP-19C, of 4 k) was pre-heated in an oven at 300° F. for 2 hours and then transferred into a cooled mixing bowl. A solution made of sodium silicate solution (37.6 g) (having a: $Na_2O/SiO_2$ weight ratio of 3:2) and sodium hydroxide pellets (6.6 g) and water (3 g). The liquid mixture was added to the mixing bowl when the temperature of the sand was about 178° F. over a period of about 30 to 60 seconds. The liquid mixture was mixed until a uniform wetness was obtained. A solid mixture of dehydroxylated kaolin (20 g), calcium hydroxide (20 wt. % of the weight of dehydroxylated kaolin) and alumina trichloride (4.75 g) were then added to the sand over about 30 to 60 seconds until a uniform coating was created. A 16.7% solution of aluminum trichloride was then sprayed onto the dried coating. The mixture was then heated to a temperature of about 300° F. for about 13 to 15 minutes. The composite was then heated in an oven at 150° or 450° F. to cure. The results are shown in Table VI, the pH refers to that of an aqueous fluid (pH 7.0) to which was added the composite:

TABLE VI

| Ex. No. | 15 | 16 | 17 | 18 | 19 |
|---|---|---|---|---|---|
| Curing temperature (F.)/ time (hrs.) | 450/0.5 | 150/48 | 450/1 | 150/48 | |
| Process time (min) | 35 | 35 | | | |
| pH | 9.93 | 8.81 | 8.53 | 7.77 | |
| wt. % fines @8,000 psi | 11.21 | 12.82 | 11.5 | 12.74 | 25.7 |

Table VI shows no significant effect on crush between the samples (regardless if cured over 30 minutes versus 48 hours). Compared to a control (pristine core), the amount of fines decreased—the weight percent of fines being much less with the composite versus the pristine core.

Examples 20-24

These Examples illustrate the improvement in the geopolymerization reaction using zinc oxide. About 300 g of silica sand of 30/50 mesh (and a crush resistance rating, API-RP-19C, of 4 k) was added to a reactor, without pre-heating. While rotating the reactor, a slurry comprised of sodium silicate ($nNa_2O/n\ SiO_2$ of 3.2), water, zinc oxide and dehydroxylated kaolin was added to the reactor and the slurry was evenly spread on the sand particles using a spatula. Aluminum chloride was then added as a powder, and water was sprayed onto the surface of the particles while continuing rotating the reactor. The reactor was heated using a heat gun. The resulting composite was then removed from the reactor and placed in a metal pan. The metal pan was placed in an oven for 40 minutes to finalize the curing process. The results are shown in Table VI where the baseline is the control where the sand was not subjected to any processing and the pH refers to that of an aqueous fluid (pH 7.0) to which was added the composite and a temperature of 150° F. maintained for 3 hours:

TABLE VII

| Example Nos. | | | | |
|---|---|---|---|---|
| Sodium Silicate Solution (g) | 36.60 | 36.60 | 36.60 | 36.60 |
| Sodium Hydroxide (g) | 13.27 | 13.27 | 13.27 | 13.27 |
| Water (g) | 15 | 15 | 15 | 15 |
| Dehydroxylated kaolin, g | 29.6 | 14.8 | 14.8 | 14.8 |
| Aluminum trichloride (g) | 7.98 | 7.98 | 7.98 | 7.98 |
| Water added at the end of process(g) | 13.30 | 13.30 | 13.30 | 13.30 |
| Zinc Oxide < 5 micron (g) | | 14.80 | 14.80 | 14.80 |
| Fine (wt. %) at 8,000 psi | 20.60 | 9.80 | 8.30 | 7.20 | 8.00 |
| Curing time | | 30 min | 40 min | overnight | 40 min |
| Curing temp | | 450° F. | 450° F. | ambient | 150° F. |
| pH | | 6.65 | 6.76 | 6.80 | 6.76 |
| pH after 3 hr@150 F. | | 7.39 | 7.14 | 7.80 | 6.93 |
| Acid Solubility | | 4.48 | | | 8.02 |

Table VI shows samples that used ZnO had an amount of fines at 8,000 psi much less than uncoated silica and within API requirements. It can be concluded that using ZnO improves the process in terms of curing temperature—curing at room temperature being as efficient as curing at high temperature. Furthermore, Table VI shows near neutral pH when the particles are soaked in water. The pH remains stable after exposure to 150° F. for 3 hours.

Examples 25-27

The Examples illustrate improvement in the process of preparing a geopolymer using zinc oxide. About 300 g of silica sand of 30/50 mesh (and a crush resistance rating, API-RP-19C, of 4 k) was pre-treated with sodium hydroxide for 1 minute. The treated sand was added to a reactor, without pre-heating of the reactor. While rotating the reactor, a slurry of potassium silicate ($nKO_2/nAl_2O_3$ of 3.2, molar ratio), water, zinc oxide and dehydroxylated kaolin was added and the slurry was evenly spread on the sand particles using a spatula. The reactor was heated for six minutes. Aluminum chloride was then then added as a powder, and water was sprayed onto the surface of the particles while continuing rotation of the reactor. The reactor was heated using a heat gun for two minutes. Water was sprayed onto the coating, during hardening, and the coating was heated for an additional five minutes. The resulting composite was then removed from the reactor and heated in a metal pan in an oven for 40 minutes at 450° C. to finalize the curing process. The results are shown in Table VII wherein the baseline is the control where the sand was not subjected to any processing and the pH refers to that of an aqueous fluid (approximately 7.0) to which was added the composite and a temperature of 150° F. maintained for 3 hours:

TABLE VIII

| Ex. No. | Comp. 25 (Baseline) | 26 | 27 |
|---|---|---|---|
| amount/sand type | 300 g/30/50 Sand | 300 g/30/50 Sand | 300 g/30/50 Sand |
| 3.2 Potassium Silicate Solution (g) | | 36.60 | 36.60 |
| Sodium Hydroxide (g) in water, 15 g | | 13.27 | 13.27 |
| Dehydroxylated kaolin (g) | | 29.60 | 14.80 |
| Aluminum Chloride (g) | | 7.98 | 7.98 |
| Water (g) | | 13.30 | 13.30 |
| Zinc Oxide < 5 micron (g) | | | 14.80 |
| Fine (wt. %) at 8,000 psi | 20.60 | 13.50 | 7.70 |
| Curing temp (° F.)/Curing Time (min) | | 450/40 | 450/40 |
| pH | | 6.67 | 6.67 |
| pH after 3 hr@150 F. | | 6.93 | 6.57 |
| Acid Solubility | | 1.83 | 7.99 |
| Turbidity | | 603.65 | 411.04 |

Table VII demonstrates stabilization of the pH to neutral and a decrease in the amount of fines generated at 8,000 psi. When the amount of dehydroxylated kaolin was decreased to half, the fines decreased to 7%.

Example 28

Example 28 illustrates the improvement in the geopolymerization reaction using zinc oxide. About 300 g of silica sand of 30/50 mesh (and a crush resistance rating, API-RP-19C, of 4 k) was added to a reactor, without pre-heating. While rotating the reactor, a slurry comprised of sodium silicate ($nNa_2O/n\ SiO_2$ of 3.2), water, and dehydroxylated kaolin and citric ester was added to the reactor and the slurry was evenly spread on the sand particles using a spatula. The reactor was heated using a heat gun. After the particles dried, about half were removed from the pan and the rest was sprayed with citric acid. The resulting composite was then removed from the reactor and placed in a metal pan. The metal pan was placed in an oven for 40 minutes to finalize the curing process. When the particles not treated with citric acid had a pH of 9.95 while the ones treated by the citric acid had a pH of 9.17. This example show the benefit of generating in-situ an acid that neutralize the excess alkali hydroxide during the geopolymerization reaction.

It will be appreciated that the descriptions above with respect to particular embodiments above are not intended to limit the invention in any way, but which are simply to further highlight or illustrate the invention.

It is to be understood that the invention is not limited to the exact details of procedures, operation, exact materials, or embodiments shown and described, as modifications and equivalents will be apparent to one skilled in the art. Accordingly, the invention is therefore to be limited only by the spirit and scope of the appended claims. Further, the specification is to be regarded in an illustrative rather than a restrictive sense. For example, specific combinations of proppant or sand control particulates, coatings, reactants to form the coatings and/or cores, reaction conditions to form coatings on the proppants, hydraulic fracturing method steps, and the like, falling within the claimed parameters, but not specifically identified or tried in a particular method, are anticipated to be within the scope of this invention.

The present invention may in one non-limiting embodiment comprise, alternatively consist or in a different non-restrictive version consist essentially of the elements disclosed.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Embodiment 1

A method of treating a subterranean formation penetrated by a well comprising introducing into the well a composite comprising a proppant or sand control particulate core strengthened with a coating covering at least a portion of the proppant or sand control particulate, the coating comprising a hardened reaction product prepared from (a) silica or a silicate; (b) an alkali hydroxide or alkali oxide; (c) an aluminosilicate; and (d) at least one member selected from the group consisting of aluminum trichloride, zinc chloride, alkaline earth oxide or hydroxide, an oxide of a transition metal; and a weak organic acid or a salt, anhydride or ester thereof.

Embodiment 2

The method of Embodiment 1, wherein the composite is prepared by etching at least a portion of the surface of the proppant or sand control particulate core prior to introducing any of (a), b), (c) or (d) to the proppant or sand control particulate core.

Embodiment 3

The method of Embodiment 2, wherein the proppant or sand control particulate core is etched with sodium hydroxide and/or sodium silicate.

Embodiment 4

The method of any of Embodiments 1 to 3, wherein the molar ratio of $SiO_2:Al_2O_3$ in the aluminosilicate is from about 1:1 to about 30:1.

Embodiment 5

The method of Embodiment 4, wherein the molar ratio of $SiO_2:Al_2O_3$ in the aluminosilicate is from about 1:1 to about 6:1.

Embodiment 6

The method of any of Embodiments 1 to 5, wherein component (d) comprises aluminum trichloride.

Embodiment 7

The method of any of Embodiments 1 to 6, wherein component (d) comprises an oxide of a transition metal and/or zinc chloride.

Embodiment 8

The method of Embodiment 7, wherein the transition metal oxide is zinc oxide.

Embodiment 9

The method of any of Embodiments 1 to 6, wherein the transition metal of the transition metal containing sol is selected from the group consisting of a Group III to VIII metal.

Embodiment 10

The method of any of Embodiments 1 to 6, wherein the transition metal of the transition metal oxide is selected from the group consisting of zinc, copper, titanium, zirconium, vanadium, niobium, chromium, molybdenum, tungsten, manganese, cobalt, iron, nickel or palladium.

Embodiment 11

The method of any of Embodiments 1 to 10 wherein component (d)(v) is at least one member selected from the group consisting of acetic acid, formic acid, citric acid, oxalic acid, malonic acid, succinic acid, malic acid, tartaric acid, lactic acid, fumaric acid, propionic acid, butyric acid, chloroacetic acid, edetatic acid, pentateic acid or a salt, anhydride or ester thereof.

Embodiment 12

The method of any of Embodiments 1 to 5, wherein the composite is prepared by applying a mixture comprising (a), (b) and (c) onto the surface of the core and hardening the mixture in the presence of aluminum trichloride and/or zinc chloride.

Embodiment 13

The method of any of Embodiments 1 to 5, wherein the composite is prepared by applying a mixture comprising (a), (b), (c) and aluminum trichloride and/or zinc chloride onto the surface of the core and then hardening the mixture onto the surface of the core.

Embodiment 14

The method of Embodiment 13, further comprising applying additional aluminum trichloride and/or zinc chloride onto the surface of the core while hardening the mixture.

Embodiment 15

The method of Embodiment 12, wherein the mixture applied onto the core further comprises an alkaline earth oxide or hydroxide.

Embodiment 16

The method of Embodiment 15, wherein the coating comprises calcium silicate and sodium silicate and further wherein the calcium silicate is formed from the reaction of alkaline earth oxide or hydroxide during the hardening of the mixture.

Embodiment 17

The method of Embodiment 15 or 16, further comprising applying additional aluminum trichloride and/or zinc chloride onto the surface of the core while hardening the mixture.

Embodiment 18

The method of any of Embodiments 1 to 5 wherein the composite is prepared by applying a mixture comprising (a), (b), (c) and an oxide of a transition metal and/or zinc chloride onto the surface of the core and hardening the mixture.

Embodiment 19

The method of Embodiment 18, wherein the transition metal is zinc.

Embodiment 20

The method of Embodiment 18 or 19, further comprising applying aluminum trichloride onto the core and hardening the surface mixture onto the surface of the core in the presence of the aluminum trichloride.

Embodiment 21

The method of any of Embodiments 1 to 20, wherein the composite is a proppant and the subterranean formation is subjected to fracturing at a pressure sufficient to create or enlarge a fracture in the formation.

Embodiment 22

The method of any of Embodiments 1 to 5 wherein the core is first mixed with an aqueous solution of the silica or sodium silicate and sodium hydroxide to create a uniform wetness on the surface of the core; and the mixture of the aluminosilicate and aluminum trichloride and/or zinc chloride is introduced to the wet core.

Embodiment 23

The method of any of Embodiments 1 to 5, wherein a mixture of (a), (b), (c) and aluminum trichloride and/or zinc chloride is first spread onto the surface of the core and the aluminum trichloride, (a), (b) and (c) undergo a sol-gel exothermic reaction.

Embodiment 24

The method of any of Embodiments 1 to 5, wherein a slurry of (a) and (b) is applied onto at least a portion of the core to provide a uniform wetness to the core and then a mixture of the aluminosilicate and alumina trichloride and/or is applied to the core.

Embodiment 25

The method of Embodiment 24, wherein the mixture applied to the wet core further comprises an alkaline earth hydroxide or oxide.

Embodiment 26

The method of Embodiment 25, wherein aluminum trichloride and/or zinc chloride is further applied to the core during hardening.

Embodiment 27

The method of any of Embodiments 1 to 5, wherein a slurry of (a), (b), (c) and the transition metal oxide and/or zinc chloride is spread onto at least a portion of the core in the reactor and further wherein aluminum chloride is added to the reactor after spreading the slurry onto the core.

Embodiment 28

The method of any of Embodiments 1 to 5, wherein a sol-gel exothermic reaction first occurs between (a) and (c) in the presence of (b) and further wherein either the aluminum trichloride, zinc chloride, alkaline earth oxide or hydroxide, oxide of a transition metal, zinc chloride or weak organic acid, salt, anhydride or ester thereof is then applied onto the core.

Embodiment 29

The method of any of Embodiments 1 to 5, wherein the composite is prepared by a sol-gel exothermic reaction comprising (a) combining in a vessel the proppant core with a mixture comprising (i) sodium silicate and/or silica and the alkali hydroxide to wet the sand; (b) adding to the wet sand a mixture of (i) dehydroxylated kaolin, (ii) zinc oxide and/or zinc chloride, alkaline earth hydroxide and/or oxide; (ii) optional aluminum trichloride; and hardening the mixture onto the proppant core; (c) hardening the mixture onto at least a portion of the surface of the proppant core in the vessel; (d) applying a liquid solution of aluminum trichloride and/or zinc chloride onto the proppant core during hardening of the mixture; (e) removing the hardened mixture from the vessel; and (f) curing the product of step (e).

Embodiment 30

The method of any of Embodiments 1 to 29, wherein the core is heated prior to contacting the core with the silica or silicate.

Embodiment 31

The method of Embodiment 30, where the core is heated to between about 0 and about 300° C.

Embodiment 32

The method of any of Embodiments 1 to 5, wherein the composite is prepared by a sol-gel exothermic reaction comprising (a) combining in a vessel the proppant core with a slurry comprising (i) sodium silicate and/or silica; (ii) zinc oxide and/or an alkaline earth hydroxide and/or oxide; (iii) alkali hydroxide; and (iv) dehydroxylated kaolin and applying the slurry onto the proppant core and hardening the slurry onto the proppant core; (b) adding to the product of step (a) dry aluminum chloride; (c) spraying water onto the core during hardening of the slurry; and (d) removing the hardened mixture from the vessel; and (e) curing the product of step (d).

Embodiment 33

A method of treating a subterranean formation penetrated by a well comprising introducing into the well a composite comprising a proppant or sand control particulate core strengthened with a coating covering at least a portion of the proppant, the coating comprising a cured reaction product prepared from (a) compound selected from the group consisting of an alkali metal phosphate, a phosphoric acid, ammonium phosphate, and combinations thereof and (b) a binder selected from the group consisting of a metal oxide, a metal hydroxide, an alkaline earth metal hydroxide, an alkaline earth metal oxide, an aluminosilicate, and combinations thereof; (c) an alkali hydroxide or alkali oxide; and (d) at least one member selected from the group consisting of (i) aluminum trichloride; (ii) alkaline earth oxide or hydroxide; (iii) an oxide of a transition metal and (iv) zinc chloride.

Embodiment 34

The method of any of Embodiments 1 to 33, wherein the composite is introduced into the well in a slurry, wherein the pH of the slurry is between from about 4.0 to about 12.0.

Embodiment 35

The method of any of Embodiments 1 to 34, wherein the proppant or sand control particulate core is selected from the group consisting of sand, ceramic beads, glass beads, bauxite grains, sintered bauxite, sized calcium carbonate, walnut shell fragments, aluminum pellets, nylon pellets, nut shells, gravel, resinous particles, alumina, minerals, polymeric particles, and combinations thereof.

Embodiment 36

The method of Embodiment 34, wherein the proppant or sand control particulate core is sand.

Embodiment 37

The method of any of Embodiments 1 to 36, wherein the proppant or sand control particulate core is etched with sodium hydroxide and/or sodium silicate.

Embodiment 38

The method of any of Embodiments 1 to 37, wherein the compressive strength of the composite is between from about 34 to about 130 MPA.

Embodiment 39

The method of any of Embodiments 1 to 38, wherein the surface of the composite is hydrophobic or oleophobic.

Embodiment 40

The method of any of Embodiments 1 to 38, further comprising, prior to introducing particulates of the composite into a fracture, treating the surface of the composite with a surface modifying treatment agent to render the composite hydrophobic or oleophobic.

Embodiment 41

The method of any of Embodiments 1 to 38 further comprising modifying the surface of the composite by applying onto the surface a treatment agent and hardening the treatment agent onto the surface of the core.

Embodiment 42

The method of Embodiment 40 or 41, wherein the treatment agent imparts at least one of the following properties to the composite: magnetism, isolator, wettability alteration, electrical conductivity or paramagnetic.

Embodiment 43

The method of Embodiment 42, wherein the treatment agent comprises nanoparticles.

Embodiment 44

The method of any of Embodiments 1 to 43, wherein apparent density of the core is less than or equal to 2.25 g/cc.

Embodiment 45

The method of Embodiment 44, wherein the apparent density of the core is less than or equal to 2.0 g/cc.

Embodiment 46

The method of Embodiment 45, wherein the apparent density of the core is less than or equal to 1.75 g/cc.

Embodiment 47

The method of Embodiment 46, wherein the apparent density of the core is less than or equal to 1.5 g/cc.

Embodiment 48

The method of Embodiment 47, wherein the apparent density of the core is less than or equal to 1.25 g/cc.

Embodiment 49

The method of any of Embodiments 1 to 48, wherein the apparent density of the composite is less than the apparent density of the core.

Embodiment 50

The method of any of Embodiments 1 to 49, wherein the Krumbein sphericity of the composite is at least 0.5, and the roundness of the composite is at least 0.5 (on the Sloss Chart).

Embodiment 51

The method of Embodiment 50, wherein the Krumbein sphericity of the composite is at least 0.6 and the roundness of the composite is at least 0.6 (on the Sloss Chart).

Embodiment 52

The method of any of Embodiments 1 to 51, wherein the core is heated prior to applying the coating onto the surface of the core.

Embodiment 53

The method of Embodiment 52, wherein the core is heated to between 0 to about 300° C.

Embodiment 54

The method any of Embodiments 1 to 51, wherein the core and the coating are mixed in a pre-heated reactor.

Embodiment 55

The method of Embodiment 54, wherein the core reactor is pre-heated to between 0 to about 300° C.

Embodiment 56

The method of any of Embodiments 1 to 55, where the composite further comprises one or more fillers selected from the group consisting of silica sand, Kevlar fibers, fly ash, sludges, slags, waste paper, rice husks, saw dust, volcanic aggregates, expanded perlite, pumice, scoria, obsidian, minerals, diatomaceous earth, mica, borosilicates, clays, metal oxides, metal fluorides, plant and animal remains, sea shells, coral, hemp fibers, manufactured fillers, silica, mineral fibers, mineral mats, chopped fiberglass, woven fiberglass, metal wools, turnings, shavings, wollastonite, nanoclays, carbon nanotubes, carbon fibers and nanofibers, graphene oxide, graphite, and combinations thereof.

What is claimed is:

1. A method of treating a subterranean formation penetrated by a well comprising introducing into the well a composite comprising a proppant or sand control particulate core strengthened with a coating covering at least a portion of the proppant or sand control particulate, the coating comprising a hardened reaction product prepared from:
   (A) silica or a silicate;
   (B) an alkali hydroxide or alkali oxide;
   (C) an aluminosilicate; and
   (D) at least one member selected from the group consisting of:
      (i) aluminum trichloride;
      (ii) alkaline earth oxide or hydroxide;
      (iii) zinc chloride;
      (iv) an oxide of a transition metal; and
      (v) weak organic acid, salt or ester thereof
   and wherein either:
   (a) component (D) is aluminum trichloride and/or zinc chloride and the composite is prepared by applying a mixture comprising (A), (B) and (C) onto the surface of the core and hardening the mixture in the presence of the aluminum trichloride and/or zinc chloride;
   (b) component (D) is aluminum trichloride and/or zinc chloride and the composite is prepared by applying a mixture comprising (A), (B), (C) and the aluminum trichloride and/or zinc chloride onto the surface of the core and then hardening the mixture onto the surface of the core;
   (c) component (D) is an oxide of a transition metal and/or zinc chloride and wherein the composite is prepared by applying a mixture comprising (A), (B) and the oxide of the transition metal and/or zinc chloride onto the surface of the core and hardening the mixture;
   (d) component (D) is aluminum trichloride and/or zinc chloride and wherein the core is first mixed with an aqueous solution of (A) and (B) to create uniformly wet the surface of the core prior to the addition of the aluminosilicate and aluminum trichloride and/or zinc chloride;
   (e) component (D) is aluminum trichloride and/or zinc chloride and wherein a mixture of (A), (B), (C) and the aluminum trichloride and/or zinc chloride are first spread onto the surface of the core prior to undergoing a sol-gel exothermic reaction;
   (f) component (D) is aluminum trichloride and/or zinc chloride and wherein a slurry of (A) and (B) is applied onto at least a portion of the core to uniformly wet the core and a mixture of the aluminosilicate and alumina trichloride and/or zinc chloride is applied to the core;
   (g) component (D) is (i) aluminum trichloride and (ii) zinc chloride and/or an oxide of a transition metal and wherein a slurry of (A), (B), (C) and the transition metal oxide and/or zinc chloride is spread onto at least a portion of the core in a reactor and further wherein the aluminum chloride is added to the reactor after spreading the slurry onto the core; or
   (h) a sol-gel exothermic reaction first occurs between (A) and (C) in the presence of (B) prior to application of (D) onto the core.

2. The method of claim 1, wherein the composite is prepared by etching at least a portion of the surface of the proppant or sand control particulate core prior to introducing any of (A), (B), (C) or (D) to the proppant or sand control particulate core.

3. The method of claim 2, wherein the proppant or sand control particulate core is etched with sodium hydroxide and/or sodium silicate.

4. The method of claim 1, wherein the transition metal of the transition metal oxide is selected from the group consisting of zinc, copper, titanium, zirconium, vanadium, niobium, chromium, molybdenum, tungsten, manganese, cobalt, iron, nickel or palladium.

5. The method of claim 1, wherein (D)(v) is at least one member selected from the group consisting of acetic acid, formic acid, citric acid, oxalic acid, malonic acid, succinic acid, malic acid, tartaric acid, lactic acid, fumaric acid, propionic acid, butyric acid, chloroacetic acid, edetatic acid, pentateic acid or a salt, anhydride or ester thereof and as mixtures thereof.

6. The method of claim 1, wherein the proppant or sand control particulate core is selected from the group consisting of sand, ceramic beads, glass beads, bauxite grains, sintered bauxite, sized calcium carbonate, walnut shell fragments, aluminum pellets, nylon pellets, nut shells, gravel, resinous particles, alumina, minerals, polymeric particles, and combinations thereof.

7. The method of claim 1, wherein the compressive strength of the composite is between from about 34 to about 130 MPA.

8. The method of claim 1, wherein the surface of the composite is hydrophobic or oleophobic.

9. The method of claim 1, wherein the surface of the composite imparts at least one of the following properties to the composite:
   (a) magnetism;
   (b) isolator;
   (c) wettability alteration;
   (d) paramagnetic; or
   (e) electrical conductivity.

10. The method of claim 1, wherein the surface of the composite is coated with nanoparticles.

11. The method of claim 1, wherein the Krumbein sphericity of the composite is at least 0.5, API-RP-19C, and the roundness of the composite is at least 0.5 (on the Sloss Chart).

12. The method of claim 1, where the coating of the composite further comprises one or more fillers selected from the group consisting of silica sand, Kevlar fibers, fly ash, sludges, slags, waste paper, rice husks, saw dust, volcanic aggregates, expanded perlite, pumice, scoria, obsidian, minerals, diatomaceous earth, mica, borosilicates, clays, metal oxides, metal fluorides, plant and animal remains, sea shells, coral, hemp fibers, manufactured fillers, silica, mineral fibers, mineral mats, chopped fiberglass, woven fiberglass, metal wools, turnings, shavings, wollastonite, nanoclays, carbon nanotubes, carbon fibers and nanofibers, graphene oxide, graphite, and combinations thereof.

13. The method of claim 1, wherein the mole ratio of silica, sodium silicate or potassium silicate to aluminosilicate forming the coating is from about 0.1:1 to about 30:1.

14. The method of claim 1, wherein component (D) is aluminum trichloride and/or zinc chloride and the composite is prepared by applying a mixture comprising (A), (B) and (C) onto the surface of the core and hardening the mixture in the presence of the aluminum trichloride and/or zinc chloride.

15. The method of claim 1, wherein component (D) is aluminum trichloride and/or zinc chloride and the composite is prepared by applying a mixture comprising (A), (B), (C) and the aluminum trichloride and/or zinc chloride onto the surface of the core and then hardening the mixture onto the surface of the core.

16. The method of claim 1, wherein component (D) is an oxide of a transition metal and/or zinc chloride and wherein the composite is prepared by applying a mixture comprising (A), (B), (C) and the oxide of the transition metal and/or zinc chloride onto the surface of the core and hardening the mixture.

17. The method of claim 1, wherein component (D) is aluminum trichloride and/or zinc chloride and wherein the core is first mixed with an aqueous solution of (A) and (B) to create uniformly wet the surface of the core prior to the addition of the aluminosilicate and aluminum trichloride and/or zinc chloride.

18. The method of claim 1, wherein component (D) is aluminum trichloride and/or zinc chloride and wherein a mixture of (A), (B), (C) and the aluminum trichloride and/or zinc chloride are first spread onto the surface of the core prior to undergoing a sol-gel exothermic reaction.

19. The method of claim 1, wherein component (D) is aluminum trichloride and/or zinc chloride and wherein a slurry of (A) and (B) is applied onto at least a portion of the core to uniformly wet the core and a mixture of the aluminosilicate and alumina trichloride and/or zinc chloride is applied to the core.

20. The method of claim 1, wherein component (D) is (i) aluminum trichloride and (ii) zinc chloride and/or an oxide of a transition metal and wherein a slurry of (A), (B), (C) and the transition metal oxide and/or zinc chloride is spread onto at least a portion of the core in a reactor and further wherein the aluminum chloride is added to the reactor after spreading the slurry onto the core.

21. The method of claim 1, wherein a sol-gel exothermic reaction first occurs between (A) and (C) in the presence of (B) prior to application of (D) onto the core.

* * * * *